(12) United States Patent
Matsumura et al.

(10) Patent No.: US 10,079,964 B2
(45) Date of Patent: Sep. 18, 2018

(54) LENS SYSTEM, INTERCHANGEABLE LENS APPARATUS, AND CAMERA SYSTEM

(71) Applicant: Panasonic Intellectual Property Management Co., Ltd., Osaka (JP)

(72) Inventors: Yoshio Matsumura, Osaka (JP); Masafumi Sueyoshi, Kanagawa (JP); Yusuke Nihei, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 272 days.

(21) Appl. No.: 14/972,150

(22) Filed: Dec. 17, 2015

(65) Prior Publication Data

US 2016/0178875 A1   Jun. 23, 2016

(30) Foreign Application Priority Data

Dec. 22, 2014  (JP) .................................. 2014-258210
Nov. 16, 2015  (JP) .................................. 2015-223567

(51) Int. Cl.
| | |
|---|---|
| *G02B 15/14* | (2006.01) |
| *H04N 5/225* | (2006.01) |
| *G02B 13/18* | (2006.01) |
| *G02B 15/17* | (2006.01) |

(52) U.S. Cl.
CPC ........... *H04N 5/2254* (2013.01); *G02B 13/18* (2013.01); *G02B 15/17* (2013.01)

(58) Field of Classification Search
CPC .... G02B 15/173; G02B 15/14; G02B 15/177; G02B 27/646; G02B 13/18

USPC ................................................... 359/676–706
See application file for complete search history.

(56) References Cited

U.S. PATENT DOCUMENTS

| | | |
|---|---|---|
| 7,057,659 B1 | 6/2006 | Mihara et al. |
| 2006/0181615 A1 | 8/2006 | Mihara et al. |
| 2007/0024725 A1 | 2/2007 | Mihara |
| 2007/0030367 A1 | 2/2007 | Mihara |
| 2007/0030368 A1 | 2/2007 | Mihara et al. |

(Continued)

FOREIGN PATENT DOCUMENTS

| | | |
|---|---|---|
| JP | 2001-208964 | 8/2001 |
| JP | 2006-215257 | 8/2006 |

(Continued)

*Primary Examiner* — William R Alexander
*Assistant Examiner* — Tamara Y Washington
(74) *Attorney, Agent, or Firm* — Wenderoth, Lind & Ponack, L.L.P.

(57) ABSTRACT

A lens system, an interchangeable lens apparatus, and a camera system each include a front group including a first focus lens group that moves with respect to an image surface in focusing from an infinity in-focus condition to a close-object in-focus condition; a rear group including a second focus lens group that moves with respect to the image surface in focusing, the front group and the rear group being located in order from an object side to an image side; a fixed lens group including at least one positive power lens element, the fixed lens group being located between the front group and the rear group and fixed with respect to the image surface in focusing; and an aperture diaphragm. The positive power lens in the fixed lens group satisfies dPgF>0.015 (dPgF is an anomalous dispersibility in a g-line and an F-line of the lens element).

18 Claims, 34 Drawing Sheets

(56) References Cited

U.S. PATENT DOCUMENTS

| | | |
|---|---|---|
| 2007/0035646 A1 | 2/2007 | Mihara et al. |
| 2009/0180199 A1 | 7/2009 | Endo |
| 2012/0081798 A1 | 4/2012 | Ryu |
| 2014/0022437 A1 | 1/2014 | Kuzuhara et al. |
| 2014/0022438 A1 | 1/2014 | Kuzuhara et al. |
| 2014/0184856 A1* | 7/2014 | Iwasawa ............... G02B 15/14 348/240.99 |
| 2014/0184887 A1 | 7/2014 | Yonetani et al. |
| 2014/0334014 A1 | 11/2014 | Matsui |

FOREIGN PATENT DOCUMENTS

| | | |
|---|---|---|
| JP | 2009-169051 | 7/2009 |
| JP | 2011-048232 | 3/2011 |
| JP | 2012-168456 | 9/2012 |
| JP | 2014-038304 | 2/2014 |
| JP | 2014-038305 | 2/2014 |
| JP | 2014-126850 | 7/2014 |
| JP | 2014-142601 | 8/2014 |
| JP | 2014-219601 | 11/2014 |

\* cited by examiner

FIG. 17

| Surface number | r | d | nd | vd | dPgF |
|---|---|---|---|---|---|
| Object surface | ∞ | Variable | | | |
| 1 | -15.5175 | 0.5051 | 1.5176 | 63.5 | |
| 2* | 10.397 | 0.7706 | | | |
| 3 | 17.8758 | 0.3788 | 1.68893 | 31.1 | |
| 4 | 8.5272 | 1.148 | 1.437 | 95.1 | 0.0564 |
| 5 | 16.2022 | 0.3788 | | | |
| 6 | 11.9316 | 1.5917 | 1.59282 | 68.6 | 0.0194 |
| 7 | -189.382 | 0.0505 | | | |
| 8* | 12.8633 | 1.887 | 1.772 | 50 | |
| 9* | -18.8618 | Variable | | | |
| 10 | 52.0396 | 0.3283 | 1.48749 | 70.4 | |
| 11 | 7.5855 | Variable | | | |
| 12(Diaphragm) | ∞ | 0.7576 | | | |
| 13 | 98.7735 | 0.6294 | 1.95906 | 17.5 | 0.0466 |
| 14 | -24.2046 | 0.3283 | 1.71736 | 29.5 | |
| 15 | 11.1573 | 1.3186 | 1.59282 | 68.6 | 0.0194 |
| 16 | -23.4549 | Variable | | | |
| 17 | -28.5555 | 0.303 | 1.78472 | 25.7 | |
| 18 | 9.5908 | 1.7269 | 1.7725 | 49.6 | |
| 19 | -13.726 | Variable | | | |
| 20 | 10.8196 | 2.2903 | 2.001 | 29.1 | |
| 21 | -9.8943 | 0.3788 | 1.76182 | 26.6 | |
| 22 | 7.5265 | 1.6623 | | | |
| 23* | -32.8284 | 0.4293 | 1.68893 | 31.1 | |
| 24* | -1262.63 | 4.5707 | | | |
| 25 | ∞ | BF | | | |
| Image surface | ∞ | | | | |

FIG. 18

| | | | | |
|---|---|---|---|---|
| Surface No. 2 | K=0.00000E+00 | A4=4.52280E-05 | A6=-8.22664E-07 | A8=2.14645E-08 | A10=2.37499E-11 |
| Surface No. 8 | K=0.00000E+00 | A4=-1.86297E-04 | A6=-3.68942E-06 | A8=5.06597E-08 | A10=-1.75399E-09 |
| Surface No. 9 | K=0.00000E+00 | A4=8.35069E-05 | A6=-4.29157E-06 | A8=7.23460E-08 | A10=-1.51531E-09 |
| Surface No. 23 | K=0.00000E+00 | A4=-2.28832E-03 | A6=3.54933E-05 | A8=0.00000E+00 | A10=0.00000E+00 |
| Surface No. 24 | K=0.00000E+00 | A4=-1.70466E-03 | A6=3.81507E-05 | A8=4.43002E-07 | A10=-3.89897E-09 |

FIG. 19

| Focal length | 10 | 10.05 |
|---|---|---|
| F-number | 1.44316 | 1.52178 |
| View angle | 28.5947 | 28.0339 |
| Image height | 5 | 5.5 |
| Lens overall length | 26.8939 | 26.8939 |
| BF | 0 | 0 |
| d0 | ∞ | 102.2727 |
| dd | 0.505 | 1.7041 |
| d11 | 3.0837 | 1.8846 |
| d16 | 1.3662 | 0.505 |
| d19 | 0.505 | 1.3662 |
| Entrance pupil position | 6.6273 | 6.9438 |
| Exit pupil position | -12.3795 | -12.0994 |
| Front side principal point position | 8.5456 | 7.888 |
| Rear side principal point position | 16.8877 | 15.8366 |

FIG. 20

| Group | Initial surface | Focal length | Lens constitution length | Front side principal point position | Rear side principal point position |
|---|---|---|---|---|---|
| 1 | 1 | 12.40852 | 6.7105 | 5.65285 | 9.18151 |
| 2 | 10 | -18.25969 | 0.3283 | 0.259 | 0.36605 |
| 3 | 12 | 29.84989 | 3.0339 | 1.69512 | 2.61657 |
| 4 | 17 | 34.06094 | 2.0299 | 2.18612 | 3.14322 |
| 5 | 20 | 108.36936 | 4.7607 | -18.91494 | -14.32051 |

FIG. 21

| Surface number | r | d | nd | vd | dPgF |
|---|---|---|---|---|---|
| Object surface | ∞ | Variable | | | |
| 1 | ∞ | 0.4674 | 1.48749 | 70.4 | |
| 2 | 15.8766 | 2.0159 | | | |
| 3 | -17.7346 | 0.409 | 1.48749 | 70.4 | |
| 4 | 7.7899 | 2.3611 | 1.437 | 95.1 | 0.0564 |
| 5 | 3281.0079 | 0.0974 | | | |
| 6 | 9.0979 | 2.1172 | 1.59282 | 68.6 | 0.0194 |
| 7 | -82.8056 | 0.0974 | | | |
| 8* | 15.4173 | 0.8463 | 1.772 | 50 | |
| 9* | -99.7447 | Variable | | | |
| 10 | 18.8473 | 0.2921 | 1.48749 | 70.4 | |
| 11 | 6.5358 | Variable | | | |
| 12(Diaphragm) | ∞ | 0.6245 | | | |
| 13 | -22.4031 | 0.3243 | 1.95906 | 17.5 | 0.0466 |
| 14 | -13.2512 | 0.2532 | 1.64769 | 33.8 | |
| 15 | 6.0461 | 1.5321 | 1.59282 | 68.6 | 0.0194 |
| 16 | -16.4432 | Variable | | | |
| 17 | 58.5831 | 0.2337 | 1.80518 | 25.5 | |
| 18 | 6.3081 | 1.4315 | 1.72916 | 54.7 | |
| 19 | -23.476 | Variable | | | |
| 20 | 9.1062 | 2.8809 | 2.001 | 29.1 | |
| 21 | -7.2654 | 0.2921 | 1.72047 | 34.7 | |
| 22 | 5.6612 | 1.6631 | | | |
| 23* | -24.4673 | 0.3311 | 1.68893 | 31.1 | |
| 24* | -155.7972 | 2.9461 | | | |
| 25 | ∞ | BF | | | |
| Image surface | ∞ | | | | |

FIG. 22

| | | | | | |
|---|---|---|---|---|---|
| Surface No. 8 | K=0.00000E+00 | A4=-4.06174E-04 | A6=-8.91851E-06 | A8=-2.34117E-08 | A10=-1.17656E-09 |
| Surface No. 9 | K=0.00000E+00 | A4=-7.35149E-05 | A6=-7.34388E-06 | A8=8.15840E-08 | A10=-3.16952E-09 |
| Surface No. 23 | K=0.00000E+00 | A4=-8.03228E-03 | A6=2.46860E-04 | A8=0.00000E+00 | A10=0.00000E+00 |
| Surface No. 24 | K=0.00000E+00 | A4=-6.83184E-03 | A6=2.81414E-04 | A8=2.73056E-06 | A10=-4.04079E-08 |

FIG. 23

| Focal length | 10 | 9.9 |
|---|---|---|
| F-number | 1.44403 | 1.54319 |
| View angle | 22.5671 | 20.2901 |
| Image height | 4.1 | 4.1 |
| Lens overall length | 27.2642 | 27.2642 |
| BF | 0 | 0 |
| d0 | ∞ | 99.3207 |
| d9 | 1.0106 | 2.2238 |
| d11 | 3.2724 | 2.0592 |
| d16 | 1.3754 | 0.3894 |
| d19 | 0.3894 | 1.3754 |
| Entrance pupil position | 9.6895 | 10.1074 |
| Exit pupil position | -9.9611 | -9.7242 |
| Front side principal point position | 9.651 | 8.7712 |
| Rear side principal point position | 17.2647 | 16.3625 |

FIG. 24

| Group | Initial surface | Focal length | Lens constitution length | Front side principal point position | Rear side principal point position |
|---|---|---|---|---|---|
| 1 | 1 | 11.47993 | 8.4117 | 6.59125 | 10.03221 |
| 2 | 10 | -20.68529 | 0.2921 | 0.30297 | 0.39716 |
| 3 | 12 | 110.06775 | 2.7341 | 5.81189 | 6.83524 |
| 4 | 17 | 30.60458 | 1.6652 | 0.86348 | 1.56731 |
| 5 | 20 | 48.83561 | 5.1672 | -11.24463 | -7.02413 |

FIG. 25

| Surface number | r | d | nd | vd | dPgF |
|---|---|---|---|---|---|
| Object surface | ∞ | Variable | | | |
| 1 | -12.3793 | 0.4124 | 1.53172 | 48.8 | |
| 2 | 10.5908 | 1.972 | | | |
| 3 | -9.0742 | 0.4124 | 1.48749 | 70.4 | |
| 4 | -16.4379 | 0.0412 | | | |
| 5 | 17.8831 | 2.1286 | 1.497 | 81.6 | 0.0375 |
| 6 | -11.9253 | 0.0412 | | | |
| 7 | 10.2087 | 1.2623 | 1.497 | 81.6 | 0.0375 |
| 8 | 37.0513 | 0.0412 | | | |
| 9 | 7.6076 | 1.3673 | 1.8042 | 46.5 | |
| 10 | 8.1859 | Variable | | | |
| 11* | 11.4102 | 1.8957 | 1.587 | 59.6 | |
| 12 | -8.7365 | 0.3093 | 1.68893 | 31.2 | |
| 13 | -283.7748 | Variable | | | |
| 14(Diaphragm) | ∞ | 1.1845 | | | |
| 15 | -9.7704 | 0.6894 | 1.95906 | 17.5 | 0.0466 |
| 16 | -5.5672 | 0.2474 | 1.72825 | 28.3 | |
| 17 | 5.9421 | 1.3335 | 2.001 | 29.1 | |
| 18 | -20.9655 | 0.2062 | | | |
| 19 | 36.5 | 1.2768 | 1.59282 | 68.6 | 0.0194 |
| 20 | -4.8537 | 0.1856 | 1.72825 | 28.3 | |
| 21 | 37.5299 | Variable | | | |
| 22* | -206.1877 | 0.6767 | 1.772 | 50 | |
| 23* | -9.6625 | Variable | | | |
| 24 | -8.1477 | 0.4124 | 1.68893 | 31.1 | |
| 25* | -206.1877 | 3.6701 | | | |
| 26 | ∞ | BF | | | |
| Image surface | ∞ | | | | |

FIG. 26

| Surface No. 11 | K=0.00000E+00 | A4=-3.38937E-04 | A6=-1.60796E-06 | A8=-1.98242E-08 | A10=3.90442E-09 | A12=0.00000E+00 |
| --- | --- | --- | --- | --- | --- | --- |
| Surface No. 22 | K=0.00000E+00 | A4=-3.56090E-03 | A6=1.66805E-04 | A8=-5.25098E-05 | A10=3.57747E-06 | A12=0.00000E+00 |
| Surface No. 23 | K=0.00000E+00 | A4=-2.15545E-03 | A6=1.61837E-04 | A8=-4.41498E-05 | A10=2.97519E-06 | A12=-3.05674E-09 |
| Surface No. 25 | K=0.00000E+00 | A4=-8.72682E-04 | A6=1.66078E-04 | A8=2.72710E-05 | A10=-2.34975E-06 | A12=7.47746E-08 |

FIG. 27

| | | |
|---|---|---|
| Focal length | 10 | 9.33 |
| F-number | 1.44097 | 1.52228 |
| View angle | 24.1898 | 23.0601 |
| Image height | 4.1 | 4.1 |
| Lens overall length | 24.7422 | 24.7422 |
| BF | 0 | 0 |
| d0 | ∞ | 96.2937 |
| d10 | 2.5627 | 1.7171 |
| d13 | 0.5951 | 1.4406 |
| d21 | 1.406 | 0.8254 |
| d23 | 0.4123 | 0.9929 |
| Entrance pupil position | 7.742 | 7.9628 |
| Exit pupil position | -9.1367 | -8.8205 |
| Front side principal point position | 6.7832 | 6.2453 |
| Rear side principal point position | 14.7306 | 14.4711 |

FIG. 28

| Group | Initial surface | Focal length | Lens constitution length | Front side principal point position | Rear side principal point position |
|---|---|---|---|---|---|
| 1 | 1 | 24.34954 | 7.6786 | 8.23832 | 12.93589 |
| 2 | 11 | 23.38876 | 2.205 | -0.24759 | 0.59426 |
| 3 | 14 | 79.06912 | 5.1234 | 2.34805 | 4.13802 |
| 4 | 22 | 13.1119 | 0.6767 | 0.40006 | 0.69545 |
| 5 | 24 | -12.32362 | 0.4124 | -0.01005 | 0.15796 |

FIG. 29

| Surface number | r | d | nd | vd | dPgF |
|---|---|---|---|---|---|
| Object surface | ∞ | Variable | | | |
| 1 | 5.1428 | 1.4775 | 1.713 | 53.9 | |
| 2 | 45.986 | 0.2313 | | | |
| 3 | 7.9862 | 0.4862 | 1.8042 | 46.5 | |
| 4 | 16.7674 | 0.2299 | | | |
| 5 | 212.2011 | 0.2299 | 1.76182 | 26.6 | |
| 6 | 5.7471 | 0.3448 | 1.525 | 70.3 | |
| 7* | 6.8496 | 0.779 | | | |
| 8 (Diaphragm) | ∞ | Variable | | | |
| 9 | 9.8739 | 0.1379 | 1.7725 | 49.6 | |
| 10 | 4.0901 | Variable | | | |
| 11 | 4.5339 | 0.9185 | 1.437 | 95.1 | 0.0564 |
| 12 | -7.2361 | Variable | | | |
| 13 | 32.4928 | 0.1379 | 1.5168 | 64.2 | |
| 14 | 5.7079 | Variable | | | |
| 15 | 5.7075 | 1.4377 | 1.8042 | 46.5 | |
| 16 | -25.1222 | 0.3678 | | | |
| 17 | -5.3432 | 0.1379 | 1.5168 | 64.2 | |
| 18 | 7.1265 | 2.2241 | | | |
| 19 | ∞ | BF | | | |
| Image surface | ∞ | | | | |

FIG. 30

| Surface No. 7 | K=0.00000E+00 | A4=2.27620E-03 | A6=3.04205E-05 | A8=1.41502E-05 |
|---|---|---|---|---|

FIG. 31

| | | |
|---|---|---|
| Focal length | 10 | 9.33 |
| F-number | 1.45033 | 1.5728 |
| View angle | 13.4981 | 12.1434 |
| Image height | 2.4 | 2.4 |
| Lens overall length | 12.3698 | 12.3698 |
| BF | 0 | 0 |
| d0 | ∞ | 104.598 |
| d8 | 0.2298 | 1.1204 |
| d10 | 1.7449 | 0.8543 |
| d12 | 0.2068 | 0.8087 |
| d14 | 1.0478 | 0.446 |
| Entrance pupil position | 4.5209 | 4.5209 |
| Exit pupil position | -6.7372 | -6.3425 |
| Front side principal point position | -0.3208 | -2.2398 |
| Rear side principal point position | 2.3702 | 2.1073 |

FIG. 32

| Group | Initial surface | Focal length | Lens constitution length | Front side principal point position | Rear side principal point position |
|---|---|---|---|---|---|
| 1 | 1 | 10.92198 | 3.7786 | -1.94848 | -0.28425 |
| 2 | 9 | -9.13371 | 0.1379 | 0.13421 | 0.19349 |
| 3 | 11 | 6.53354 | 0.9185 | 0.2522 | 0.51599 |
| 4 | 13 | -13.42193 | 0.1379 | 0.11048 | 0.15731 |
| 5 | 15 | 33.09894 | 1.9434 | -5.86416 | -4.10347 |

FIG. 33

| Surface number | r | d | nd | vd | dPgF |
|---|---|---|---|---|---|
| Object surface | ∞ | Variable | | | |
| 1 | 5.0156 | 0.27 | 2.00069 | 25.5 | |
| 2 | 8.301 | Variable | | | |
| 3 | 5.5474 | 0.1494 | 2.00069 | 25.5 | |
| 4 | 2.6156 | 0.8271 | 1.497 | 81.6 | 0.0375 |
| 5 | 6.0596 | 0.023 | | | |
| 6 | 4.1265 | 0.8271 | 1.91082 | 35.2 | |
| 7 | 17.113 | Variable | | | |
| 8 | -352.8657 | 0.1494 | 1.91082 | 35.2 | |
| 9 | 2.699 | 0.5274 | 1.95906 | 17.5 | 0.0466 |
| 10 | 3.5957 | 0.4023 | | | |
| 11(Diaphragm) | ∞ | Variable | | | |
| 12 | 4.8651 | 0.8271 | 1.883 | 40.8 | |
| 13 | -50.0022 | 0.0345 | | | |
| 14 | 9.7011 | 0.1379 | 1.76182 | 26.5 | |
| 15 | 2.8307 | 1.3793 | 1.497 | 81.6 | 0.0375 |
| 16 | -4.0892 | Variable | | | |
| 17 | -24.677 | 0.1379 | 1.48749 | 70.4 | |
| 18 | 5.063 | 1.4259 | | | |
| 19 | -2.334 | 0.1494 | 1.48749 | 70.4 | |
| 20 | 7.6468 | 0.6672 | 1.91082 | 35.2 | |
| 21 | -7.5152 | 0.6897 | | | |
| 22 | -2.8903 | 0.1494 | 1.92286 | 20.9 | 0.0299 |
| 23 | -3.2403 | 2.1661 | | | |
| 24 | ∞ | BF | | | |
| Image surface | ∞ | | | | |

FIG. 34

| Focal length | 10 | 9.27 |
|---|---|---|
| F-number | 2.91296 | 3.04824 |
| View angle | 13.72 | 12.7999 |
| Image height | 2.45 | 2.45 |
| Lens overall length | 12.6144 | 12.6144 |
| BF | 0 | 0 |
| d0 | ∞ | 102.9415 |
| d2 | 0.4101 | 0.2298 |
| d7 | 0.2298 | 0.4101 |
| d 11 | 0.8045 | 0.5923 |
| d16 | 0.2298 | 0.4421 |
| Entrance pupil position | 3.8422 | 3.9588 |
| Exit pupil position | -7.0913 | -6.9728 |
| Front side principal point position | -0.2645 | -0.9684 |
| Rear side principal point position | 2.6118 | 2.4244 |

FIG. 35

| Group | Initial surface | Focal length | Lens constitution length | Front side principal point position | Rear side principal point position |
|---|---|---|---|---|---|
| 1 | 1 | 12.1638 | 0.27 | -0.19789 | -0.05751 |
| 2 | 3 | 12.73834 | 1.8266 | 0.2905 | 1.04093 |
| 3 | 8 | -3.99387 | 1.0791 | 0.36409 | 0.69244 |
| 4 | 12 | 3.65463 | 2.3788 | 0.63216 | 1.35912 |
| 5 | 17 | -5.86451 | 3.2195 | 0.21605 | 0.61224 |

FIG. 36

| Surface number | r | d | nd | vd | dPgF |
|---|---|---|---|---|---|
| Object surface | ∞ | Variable | | | |
| 1 | 5.8343 | 0.4429 | 1.8466 | 23.8 | |
| 2 | -61.82 | Variable | | | |
| 3 | -14.0349 | 0.1447 | 2.00069 | 25.5 | |
| 4 | 3.5267 | 0.598 | 1.497 | 81.6 | 0.0375 |
| 5 | 13.0353 | 0.0223 | | | |
| 6 | 4.2613 | 0.7073 | 1.91082 | 35.2 | |
| 7 | -9.4048 | 0.2227 | | | |
| 8 | -7.4918 | 0.1447 | 1.8061 | 33.3 | |
| 9 | 2.6144 | 0.2463 | 1.95906 | 17.5 | 0.0466 |
| 10 | 3.5518 | 0.3897 | | | |
| 11(Diaphragm) | ∞ | Variable | | | |
| 12 | 4.478 | 0.2917 | 1.883 | 40.8 | |
| 13 | 12.8565 | 0.0334 | | | |
| 14 | 4.4833 | 0.1336 | 1.76182 | 26.5 | |
| 15 | 2.4541 | 1.3361 | 1.497 | 81.6 | 0.0375 |
| 16 | -8.3903 | Variable | | | |
| 17 | 4.3086 | 0.1336 | 1.48749 | 70.4 | |
| 18 | 2.7031 | 2.4783 | | | |
| 19 | -2.5415 | 0.1447 | 1.48749 | 70.4 | |
| 20 | 7.0606 | 0.6199 | 1.91082 | 35.2 | |
| 21 | -9.7164 | 0.668 | | | |
| 22 | -2.5511 | 0.1447 | 1.92286 | 20.9 | 0.0299 |
| 23 | -2.6441 | 2.0982 | | | |
| 24 | ∞ | BF | | | |
| Image surface | ∞ | | | | |

FIG. 37

| Focal length | 10 | 9.63 |
|---|---|---|
| F-number | 2.91269 | 3.22764 |
| View angle | 13.4869 | 12.2156 |
| Image height | 2.4 | 2.4 |
| Lens overall length | 12.5607 | 12.5149 |
| BF | 0 | 0 |
| d0 | ∞ | 106.5787 |
| d2 | 0.558 | 0.5121 |
| d11 | 0.7793 | 0.2915 |
| d16 | 0.2226 | 0.7105 |
| Entrance pupil position | 3.399 | 3.2921 |
| Exit pupil position | -7.9481 | -7.7904 |
| Front side principal point position | 0.8082 | -0.6466 |
| Rear side principal point position | 2.5549 | 1.9292 |

FIG. 38

| Group | Initial surface | Focal length | Lens constitution length | Front side principal point position | Rear side principal point position |
|---|---|---|---|---|---|
| 1 | 1 | 6.31563 | 0.4429 | 0.02075 | 0.22309 |
| 2 | 3 | -3.83082 | 2.4757 | 0.82175 | 1.76229 |
| 3 | 12 | 4.1927 | 1.7948 | 0.25936 | 0.83307 |
| 4 | 17 | -9.99129 | 4.1892 | 0.36741 | 0.60635 |

FIG. 39

| Surface number | r | d | nd | vd | dPgF |
|---|---|---|---|---|---|
| Object surface | ∞ | | | | |
| 1 | 59.9026 | 0.5884 | 1.5168 | 64.2 | |
| 2 | -150.9309 | Variable | | | |
| 3 | 16.5217 | 0.35 | 1.713 | 53.9 | |
| 4 | 3.6829 | 1.9354 | | | |
| 5 | -33.7084 | 0.3 | 1.90366 | 31.3 | |
| 6 | 21.7846 | 0.7161 | 1.80518 | 25.5 | |
| 7 | -7.8762 | Variable | | | |
| 8 | -5.8684 | 0.35 | 1.68893 | 31.1 | |
| 9* | -13.0721 | Variable | | | |
| 10 | 5.7267 | 2.0059 | 1.81 | 41 | |
| 11* | -18.4529 | 0.5465 | | | |
| 12(Diaphragm) | ∞ | 0.4603 | | | |
| 13 | -66.6718 | 0.2 | 1.90366 | 31.3 | |
| 14 | 3.6647 | 2.1834 | 1.497 | 81.6 | 0.0375 |
| 15 | -8.2298 | 0.3824 | | | |
| 16 | 13.1334 | 0.5467 | 1.59282 | 68.6 | 0.0194 |
| 17 | -8.2983 | Variable | | | |
| 18* | 35.3024 | 0.3 | 1.81 | 41 | |
| 19* | 5.6298 | Variable | | | |
| 20 | 9.3134 | 1.2318 | 1.48749 | 70.4 | |
| 21 | 16.3604 | 1.2357 | | | |
| 22 | -7.3196 | 0.3 | 1.62041 | 60.3 | |
| 23 | 25.2155 | 1.2874 | 1.92286 | 20.9 | 0.0299 |
| 24 | -22.9544 | Variable | | | |
| 25 | ∞ | BF | | | |
| Image surface | ∞ | | | | |

FIG. 40

| Surface No. 9 | K=0.00000E+00 | A4=-1.08217E-03 | A6=-1.00877E-04 | A8=1.42612E-05 | A10=-2.99274E-06, | A12=2.08817E-07 |
| --- | --- | --- | --- | --- | --- | --- |
| Surface No. 11 | K=0.00000E+00 | A4=1.85970E-03 | A6=2.48846E-06 | A8=-4.85767E-06 | A10=3.35378E-07, | A12=0.00000E+00 |
| Surface No. 18 | K=1.00000E+02 | A4=0.00000E+00 | A6=0.00000E+00 | A8=0.00000E+00 | A10=0.00000E+00, | A12=0.00000E+00 |
| Surface No. 19 | K=0.00000E+00 | A4=-1.97113E-04 | A6=-2.18971E-05 | A8=-8.45011E-07 | A10=2.01182E-07, | A12=0.00000E+00 |

FIG. 41

| Zoom ratio | 1.29997 | | |
|---|---|---|---|
| | Wide angle | Intermediate | Telephoto |
| Focal length | 10 | 11.4 | 13 |
| F-number | 3.62319 | 4.65997 | 5.79969 |
| View angle | 28.7736 | 25.315 | 22.3295 |
| Image height | 5.5 | 5.5 | 5.5 |
| Lens overall length | 25.001 | 28.3969 | 31.498 |
| BF | 0 | 0 | 0 |
| d2 | 0.25 | 3.3234 | 6.0335 |
| d7 | 0.6581 | 0.6462 | 0.6543 |
| d9 | 1.4257 | 0.9715 | 0.5 |
| d17 | 0.5226 | 0.5039 | 0.5101 |
| d19 | 3.2244 | 3.2431 | 3.237 |
| d24 | 4.0002 | 4.7888 | 5.6431 |
| Entrance pupil position | 4.6219 | 8.023 | 11.2228 |
| Exit pupil position | -12.5686 | -13.3671 | -14.2182 |
| Front side principal point position | 6.6576 | 9.6907 | 12.326 |
| Rear side principal point position | 14.9884 | 16.9833 | 18.4852 |

FIG. 42

| Group | Initial surface | Focal length | Lens constitution length | Front side principal point position | Rear side principal point position |
|---|---|---|---|---|---|
| 1 | 1 | 83.05701 | 0.5884 | 0.11032 | 0.31043 |
| 2 | 3 | -21.02201 | 3.3015 | -3.77362 | -4.7465 |
| 3 | 8 | -15.76984 | 0.35 | -0.17223 | -0.03365 |
| 4 | 10 | 5.63443 | 6.3252 | 3.05241 | 2.96187 |
| 5 | 18 | -8.30668 | 0.3 | 0.19809 | 0.33159 |
| 6 | 20 | -214.91394 | 4.0549 | 10.66793 | 11.26193 |

LENS SYSTEM, INTERCHANGEABLE LENS APPARATUS, AND CAMERA SYSTEM

BACKGROUND

1. Technical Field

The present disclosure relates to a lens system, an interchangeable lens apparatus and a camera system.

2. Description of the Related Art

A camera generally includes an image sensor that performs photoelectric conversion and a lens or lens system. Various kinds of lens systems used in cameras have been proposed over the years. With the downsizing of personal electronic devices, it is becoming increasingly desirable for interchangeable camera lens apparatuses that provide high performance while at the same time having a small size.

Unexamined Japanese Patent Publication No. 2011-048232, Unexamined Japanese Patent Publication No. 2012-168456, Unexamined Japanese Patent Publication No. 2014-038304, Unexamined Japanese Patent Publication No. 2014-038305, and Unexamined Japanese Patent Publication No. 2014-142601 each disclose a lens system provided with a plurality of focus lens groups that move with respect to an image surface in focusing from an infinity in-focus condition to a close-object in-focus condition.

SUMMARY

A lens system of the present disclosure includes a front group including a first focus lens group that moves with respect to an image surface in focusing from an infinity in-focus condition to a close-object in-focus condition; a rear group including a second focus lens group that moves with respect to the image surface in focusing, the front group and the rear group being located in order from an object side to an image side; a fixed lens group that is located between the front group and the rear group and fixed with respect to the image surface in focusing; and an aperture diaphragm. The lens system satisfies the following condition (1):

$$dPgF > 0.015 \qquad \text{condition(1)}$$

(where dPgF is an anomalous dispersibility in a g-line and an F-line of a positive power lens element in the fixed lens group).

An interchangeable lens apparatus in the present disclosure includes a lens system and a lens mount part connectable to a camera body, the camera body including an image sensor that receives an optical image formed by the lens system and converts the optical image into an electric image signal. The lens system includes a front group including a first focus lens group that moves with respect to an image surface in focusing from an infinity in-focus condition to a close-object in-focus condition; a rear group including a second focus lens group that moves with respect to the image surface in focusing, the front group and the rear group being located in order from an object side to an image side; a fixed lens group that is located between the front group and the rear group and fixed with respect to the image surface in focusing; and an aperture diaphragm. The lens system satisfies the following condition (1):

$$dPgF > 0.015 \qquad \text{condition(1)}$$

(where dPgF is an anomalous dispersibility in a g-line and an F-line of a positive power lens element in the fixed lens group).

A camera system in the present disclosure includes an interchangeable lens apparatus that includes a lens system and a camera body that is detachably connected to the interchangeable lens apparatus through a camera mount part. The camera body includes an image sensor that receives an optical image formed by the lens system and converts the optical image into an electric image signal. The lens system includes a front group including a first focus lens group that moves with respect to an image surface in focusing from an infinity in-focus condition to a close-object in-focus condition; a rear group including a second focus lens group that moves with respect to the image surface in focusing, the front group and the rear group being located in order from an object side to an image side; a fixed lens group that is located between the front group and the rear group and fixed with respect to the image surface in focusing; and an aperture diaphragm. The lens system satisfies the following condition (1):

$$dPgF > 0.015 \qquad \text{condition(1)}$$

(where dPgF is an anomalous dispersibility in a g-line and an F-line of a positive power lens element in the fixed lens group).

The lens system in the present disclosure enables occurrence of aberration to be reduced.

BRIEF DESCRIPTION OF DRAWINGS

FIG. 17 shows surface data of the lens system according to the first numerical example;

FIG. 18 shows aspherical data of the lens system according to the first numerical example;

FIG. 19 shows various data of the lens system according to the first numerical example;

FIG. 20 shows lens group data of the lens system according to the first numerical example;

FIG. 21 shows surface data of the lens system according to the second numerical example;

FIG. 22 shows aspherical data of the lens system according to the second numerical example;

FIG. 23 shows various data of the lens system according to the second numerical example;

FIG. 24 shows lens group data of the lens system according to the second numerical example;

FIG. 25 shows surface data of the lens system according to the third numerical example;

FIG. 26 shows aspherical data of the lens system according to the third numerical example;

FIG. 27 shows various data of the lens system according to the third numerical example;

FIG. 28 shows lens group data of the lens system according to the third numerical example;

FIG. 29 shows surface data of the lens system according to the fourth numerical example;

FIG. 30 shows aspherical data of the lens system according to the fourth numerical example;

FIG. 31 shows various data of the lens system according to the fourth numerical example;

FIG. 32 shows lens group data of the lens system according to the fourth numerical example;

FIG. 33 shows surface data of the lens system according to the fifth numerical example;

FIG. 34 shows various data of the lens system according to the fifth numerical example;

FIG. 35 shows lens group data of the lens system according to the fifth numerical example;

FIG. 36 shows surface data of the lens system according to the sixth numerical example;

FIG. 37 shows various data of the lens system according to the sixth numerical example;

FIG. 38 shows lens group data of the lens system according to the sixth numerical example;

FIG. 39 shows surface data of the lens system according to the seventh numerical example;

FIG. 40 shows aspherical data of the lens system according to the seventh numerical example;

FIG. 41 shows various data of the lens system according to the seventh numerical example; and FIG. 42 shows lens group data of the lens system according to the seventh numerical example.

DETAILED DESCRIPTION

Hereinbelow, exemplary embodiments will be described in detail with reference to the drawings. However, unnecessarily detailed description may be omitted. For example, detailed description for already well-known matters or overlapping description for substantially identical configurations may be omitted in order to avoid the following description from becoming unnecessarily redundant and to facilitate understanding of the following description by a person skilled in the art. For example, the d-line, F-line, C-line, and g-line discussed herein are examples of Fraunhofer lines.

It should be noted that the accompanying drawings and the following description are provided so that a person skilled in the art can fully understand the present disclosure. Therefore, the accompanying drawings and the following description are not intended to limit the subject matter defined by the claims.

FIGS. 1, 3, 5, 7, 9 and 11 are lens arrangement diagrams of lens systems according to first to sixth exemplary embodiments, respectively. Each of the lens arrangement diagrams illustrates a lens configuration in an infinity in-focus condition.

In each of the drawings, a plus sign (+) or minus sign (−) attached to a mark of each lens group corresponds to a sign of power of the lens group. In each of the drawings, a straight line located on a right-most side indicates a position of image surface S.

Further, in each of the drawings, an arrow attached to a lens group indicates a direction along which the lens group moves in focusing from an infinity in-focus condition to a close-object in-focus condition.

First Exemplary Embodiment

Figure 1:
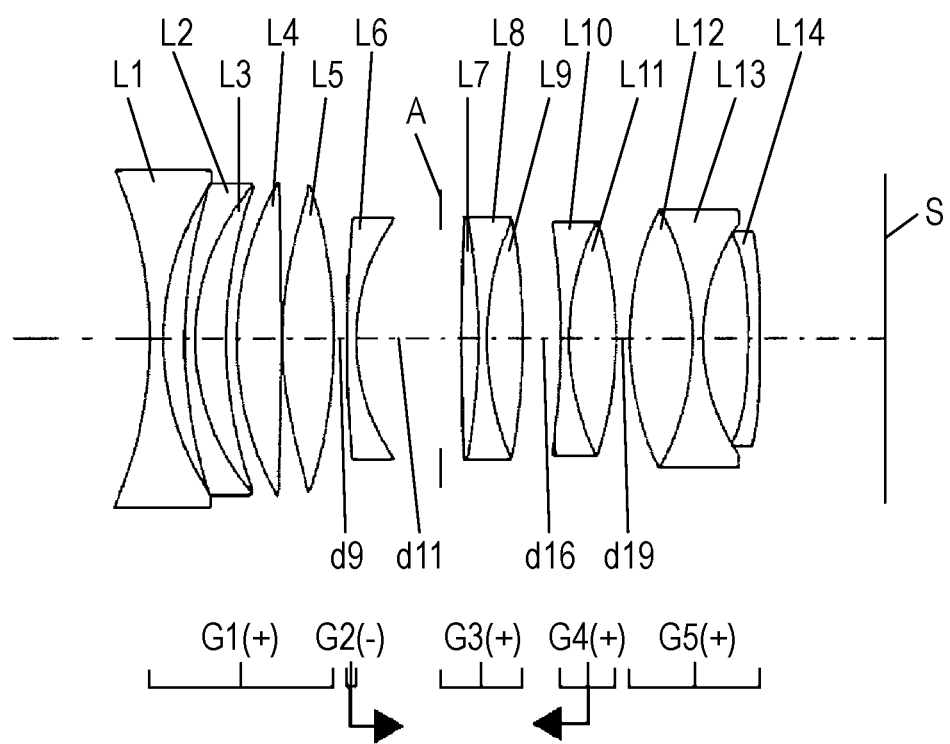
FIG. 1 is a lens arrangement diagram illustrating a lens system according to a first exemplary embodiment (first numerical example)
Figure 2:
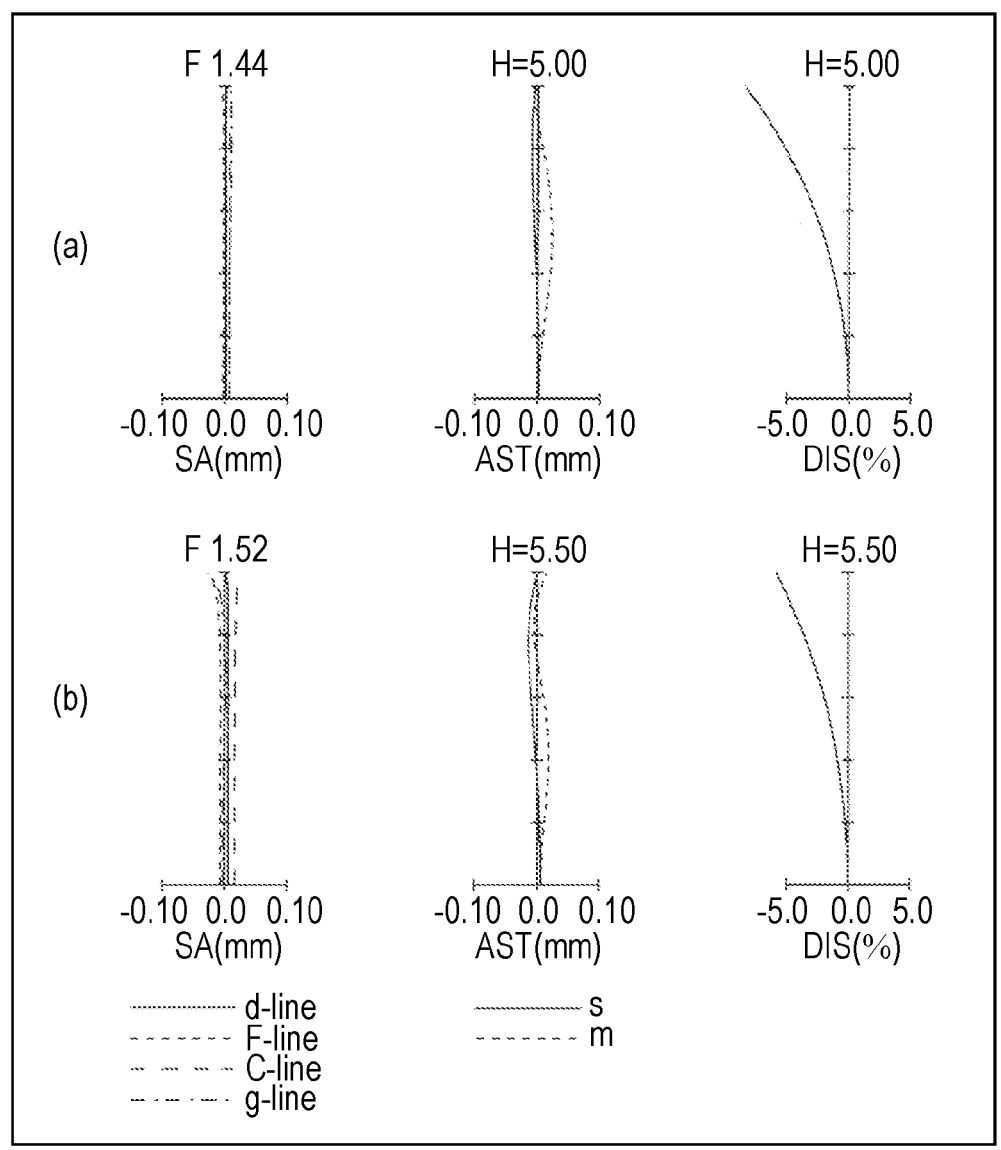
FIG. 2 is a longitudinal aberration diagram of the lens system according to the first numerical example in an infinity in-focus condition and a close-object in-focus condition.

As illustrated in FIG. 1, first lens group G1 includes, in order from an object side to an image side, bi-concave first lens element L1, negative meniscus second lens element L2 with a convex surface facing the object side, positive meniscus third lens element L3 with a convex surface facing the object side, bi-convex fourth lens element L4, and bi-convex fifth lens element L5. Among these lens elements, second lens element L2 and third lens element L3 are joined to each other.

Second lens group G2 includes only negative meniscus sixth lens element L6 with a convex surface facing the object side.

Third lens group G3 includes, in order from the object side to the image side, bi-convex seventh lens element L7, bi-concave eighth lens element L8, and bi-convex ninth lens element L9. Seventh lens element L7, eighth lens element L8, and ninth lens element L9 are joined to each other. In third lens group G3, aperture diaphragm A is disposed on the object side with respect to seventh lens element L7.

Fourth lens group G4 includes, in order from the object side to the image side, bi-concave tenth lens element L10 and bi-convex eleventh lens element L11. Tenth lens element L10 and eleventh lens element L11 are joined to each other.

Fifth lens group G5 includes, in order from the object side to the image side, bi-convex twelfth lens element L12, bi-concave thirteenth lens element L13, and negative meniscus fourteenth lens element L14 with a convex surface facing the image surface side. Among these lens elements, twelfth lens element L12 and thirteenth lens element L13 are joined to each other.

In the lens system according to the first exemplary embodiment, in focusing from an infinity in-focus condition to a close-object in-focus condition, second lens group G2 serves as a first focus lens group that moves toward the image side along an optical axis, and fourth lens group G4 serves as a second focus lens group that moves toward the object side along the optical axis.

Second Exemplary Embodiment

Figure 3:
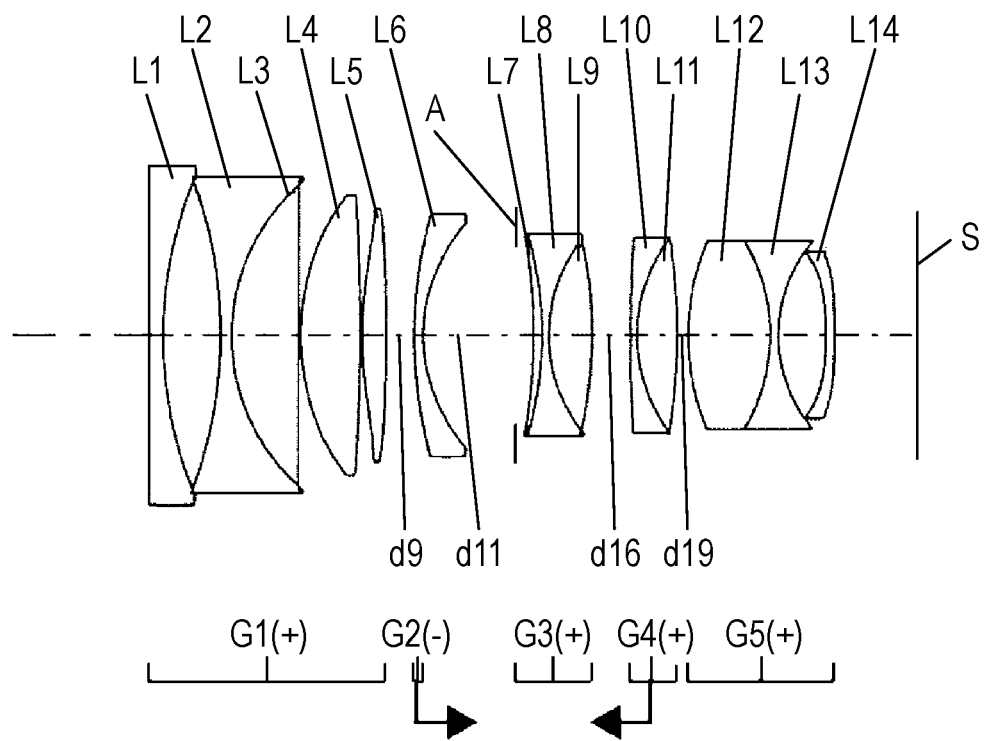
FIG. 3 is a lens arrangement diagram illustrating a lens system according to a second exemplary embodiment (second numerical example)
Figure 4:
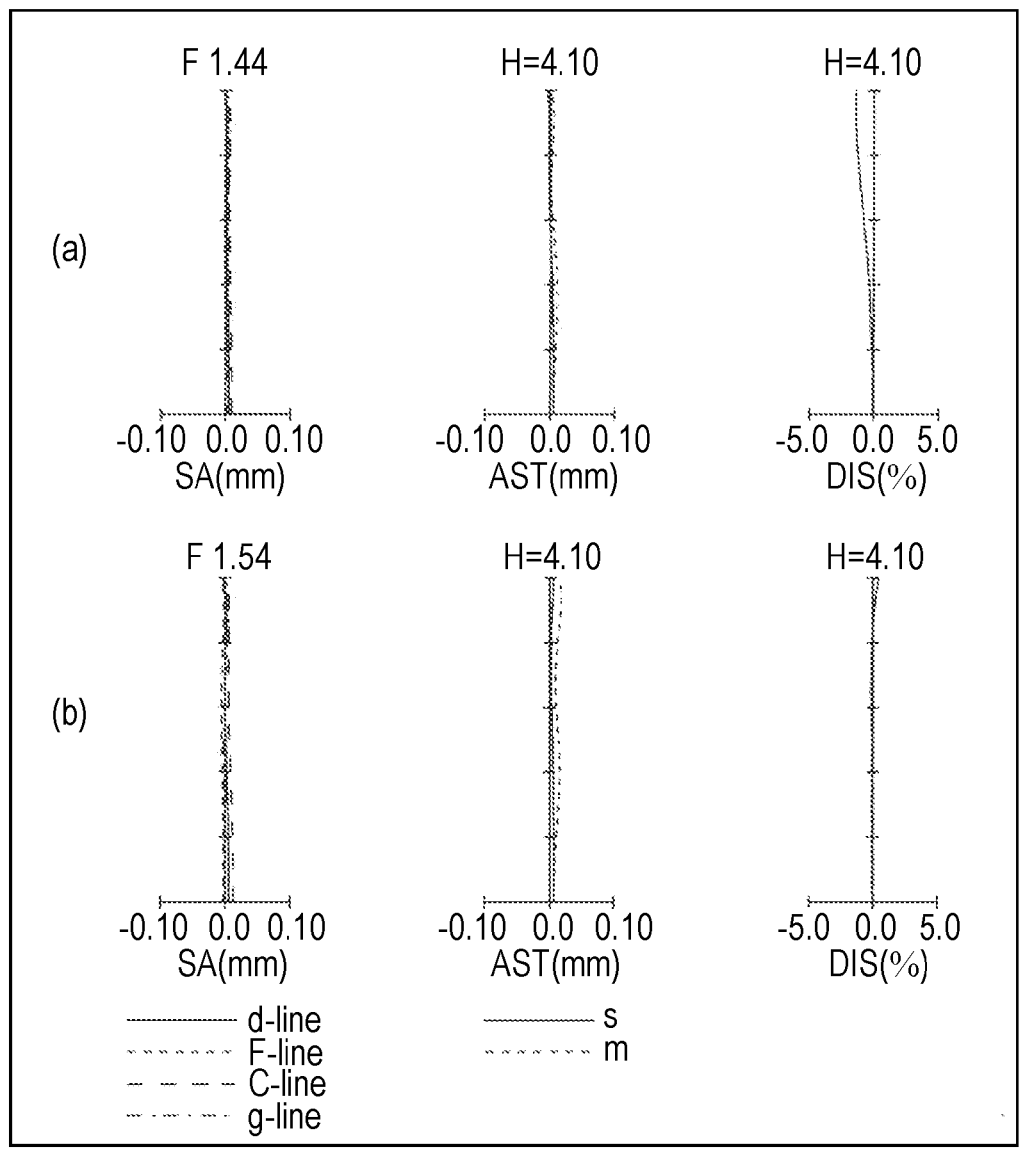
FIG. 4 is a longitudinal aberration diagram of the lens system according to the second numerical example in an infinity in-focus condition and a close-object in-focus condition.

As illustrated in FIG. 3, first lens group G1 includes, in order from an object side to an image side, plano-concave first lens element L1, bi-concave second lens element L2, positive meniscus third lens element L3 with a convex surface facing the object side, bi-convex fourth lens element L4, and bi-convex fifth lens element L5. Among these lens elements, second lens element L2 and third lens element L3 are joined to each other.

Second lens group G2 has the same configuration as second lens group G2 of the first exemplary embodiment and includes sixth lens element L6.

Third lens group G3 has the same configuration as third lens group G3 of the first exemplary embodiment and includes seventh lens element L7, eighth lens element L8, and ninth lens element L9. In third lens group G3, aperture diaphragm A is disposed on the object side with respect to seventh lens element L7.

Fourth lens group G4 includes, in order from the object side to the image side, negative meniscus tenth lens element L10 with a convex surface facing the object side and bi-convex eleventh lens element L11. Tenth lens element L10 and eleventh lens element L11 are joined to each other.

Fifth lens group G5 has the same configuration as fifth lens group G5 of the first exemplary embodiment and includes twelfth lens element L12, thirteenth lens element L13, and fourteenth lens element L14.

In the lens system according to the second exemplary embodiment, in focusing from an infinity in-focus condition to a close-object in-focus condition, second lens group G2 serves as a first focus lens group that moves toward the image side along an optical axis, and fourth lens group G4 serves as a second focus lens group that moves toward the object side along the optical axis.

Third Exemplary Embodiment

Figure 5:
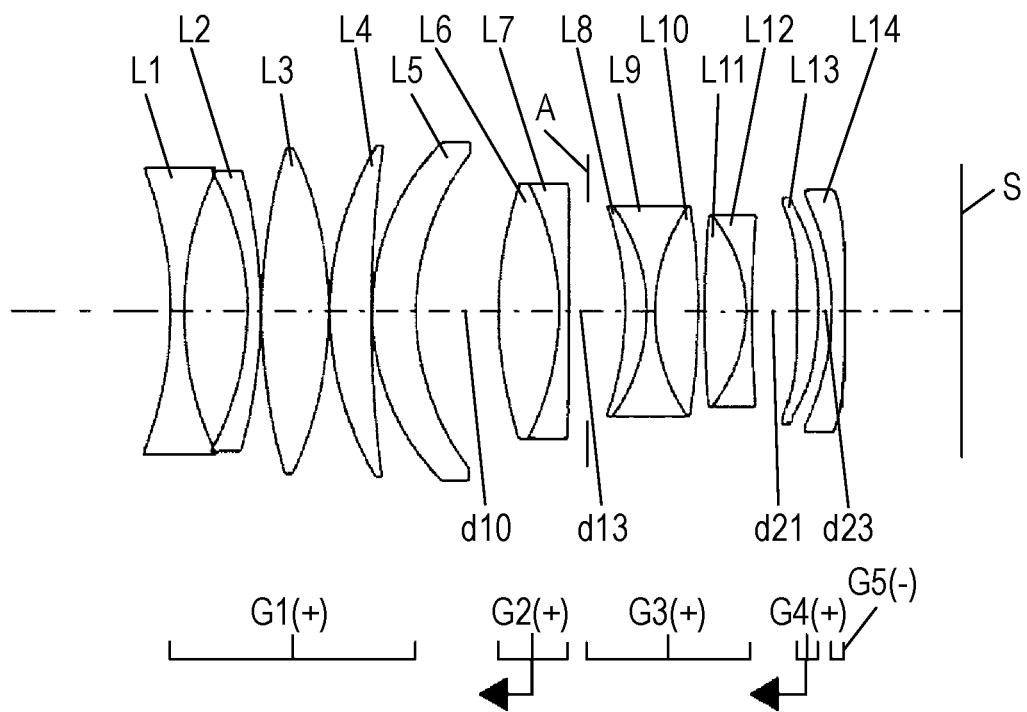
FIG. 5 is a lens arrangement diagram illustrating a lens system according to a third exemplary embodiment (third numerical example)
Figure 6:
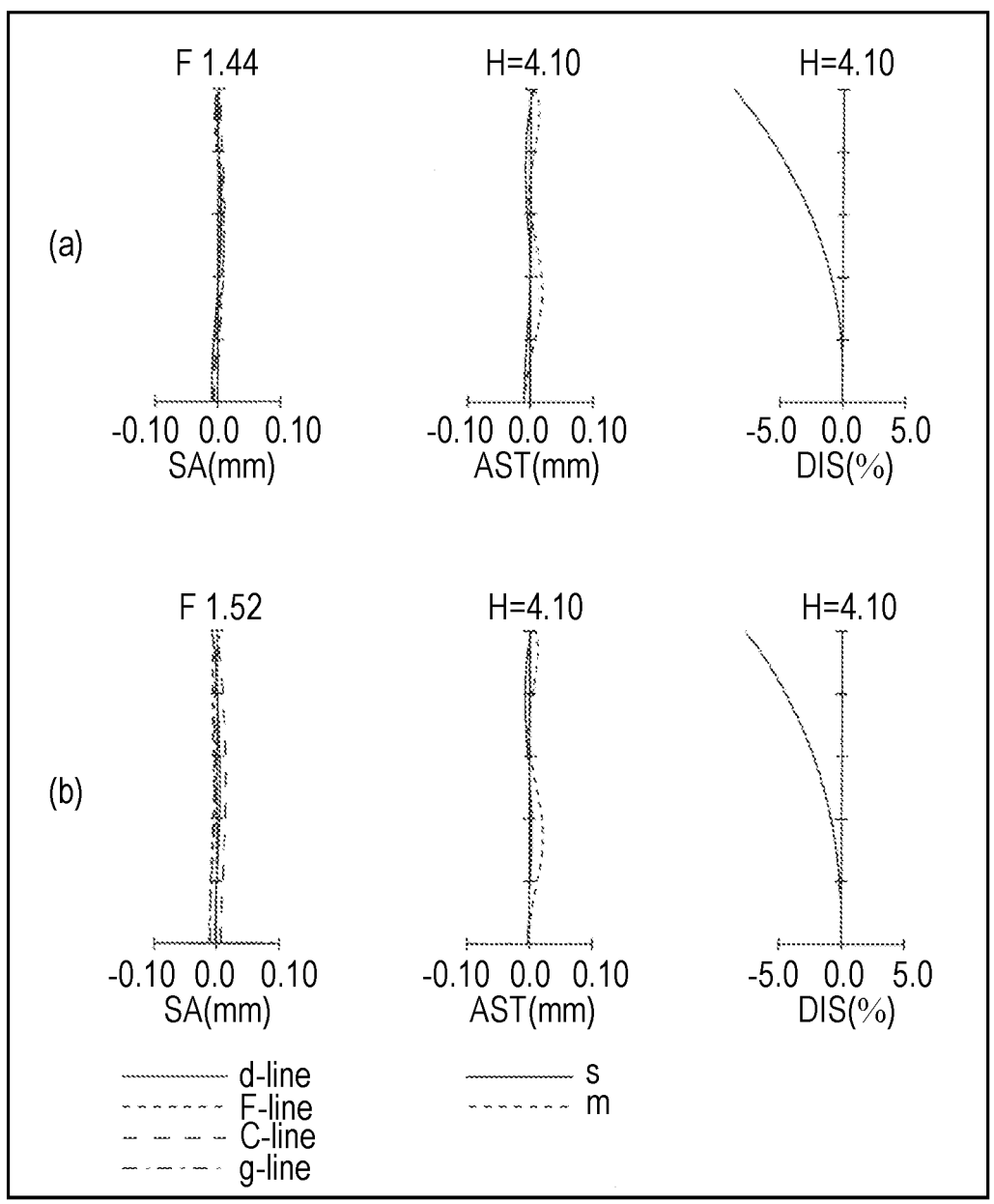
FIG. 6 is a longitudinal aberration diagram of the lens system according to the third numerical example in an infinity in-focus condition and a close-object in-focus condition.

As illustrated in FIG. 5, first lens group G1 includes, in order from an object side to an image side, bi-concave first lens element L1, negative meniscus second lens element L2 with a convex surface facing the image surface side, bi-convex third lens element L3, positive meniscus fourth lens element L4 with a convex surface facing the object side, and positive meniscus fifth lens element L5 with a convex surface facing the object side.

Second lens group G2 includes, in order from the object side to the image side, bi-convex sixth lens element L6 and negative meniscus seventh lens element L7 with a convex surface facing the image surface side. Sixth lens element L6 and seventh lens element L7 are joined to each other.

Third lens group G3 includes, in order from the object side to the image side, positive meniscus eighth lens element L8 with a convex surface facing the image surface side, bi-concave ninth lens element L9, bi-convex tenth lens element L10, bi-convex eleventh lens element L11, and bi-concave twelfth lens element L12. Eighth lens element L8, ninth lens element L9, and tenth lens element L10 are joined to each other. Further, eleventh lens element L11 and twelfth lens element L12 are joined to each other. In third lens group G3, aperture diaphragm A is disposed on the object side with respect to eighth lens element L8.

Fourth lens group G4 includes only positive meniscus thirteenth lens element L13 with a convex surface facing the image surface side.

Fifth lens group G5 includes only negative meniscus fourteenth lens element L14 with a convex surface facing the image surface side.

In the lens system according to the third exemplary embodiment, in focusing from an infinity in-focus condition to a close-object in-focus condition, second lens group G2 serves as a first focus lens group that moves toward the object side along an optical axis, and fourth lens group G4 serves as a second focus lens group that moves toward the object side along the optical axis.

Fourth Exemplary Embodiment

Figure 7:
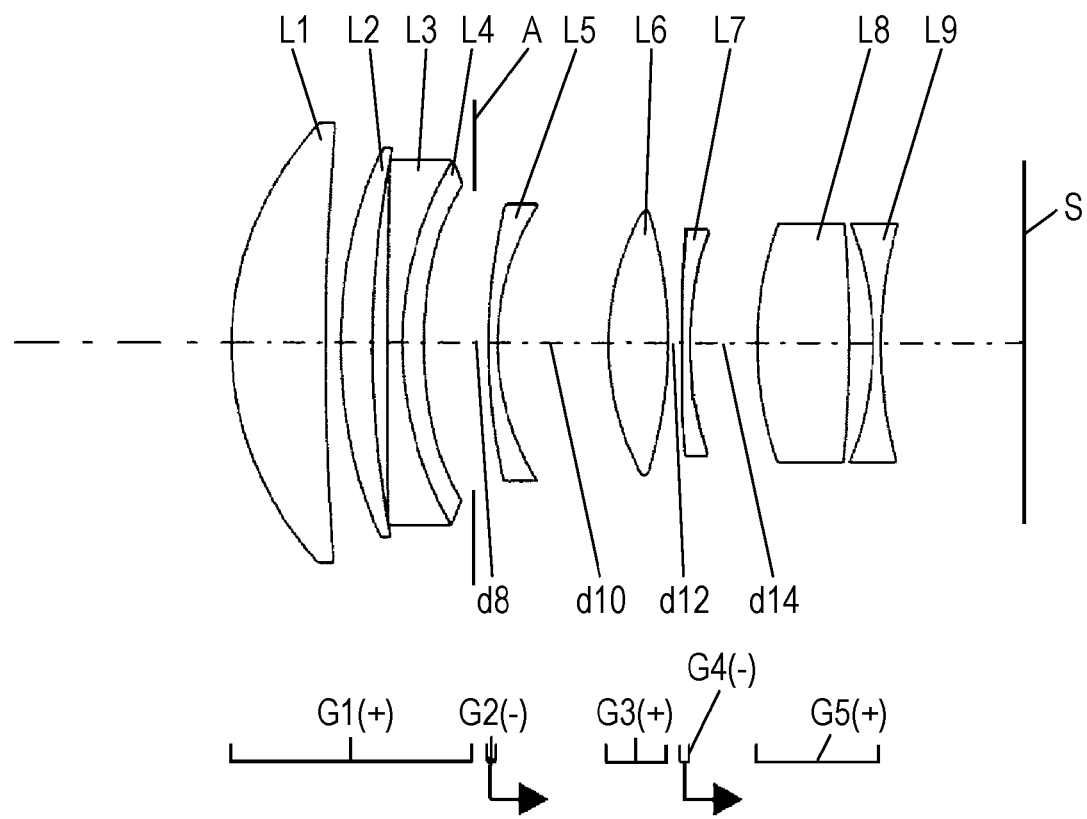
FIG. 7 is a lens arrangement diagram illustrating a lens system according to a fourth exemplary embodiment (fourth numerical example)
Figure 8:
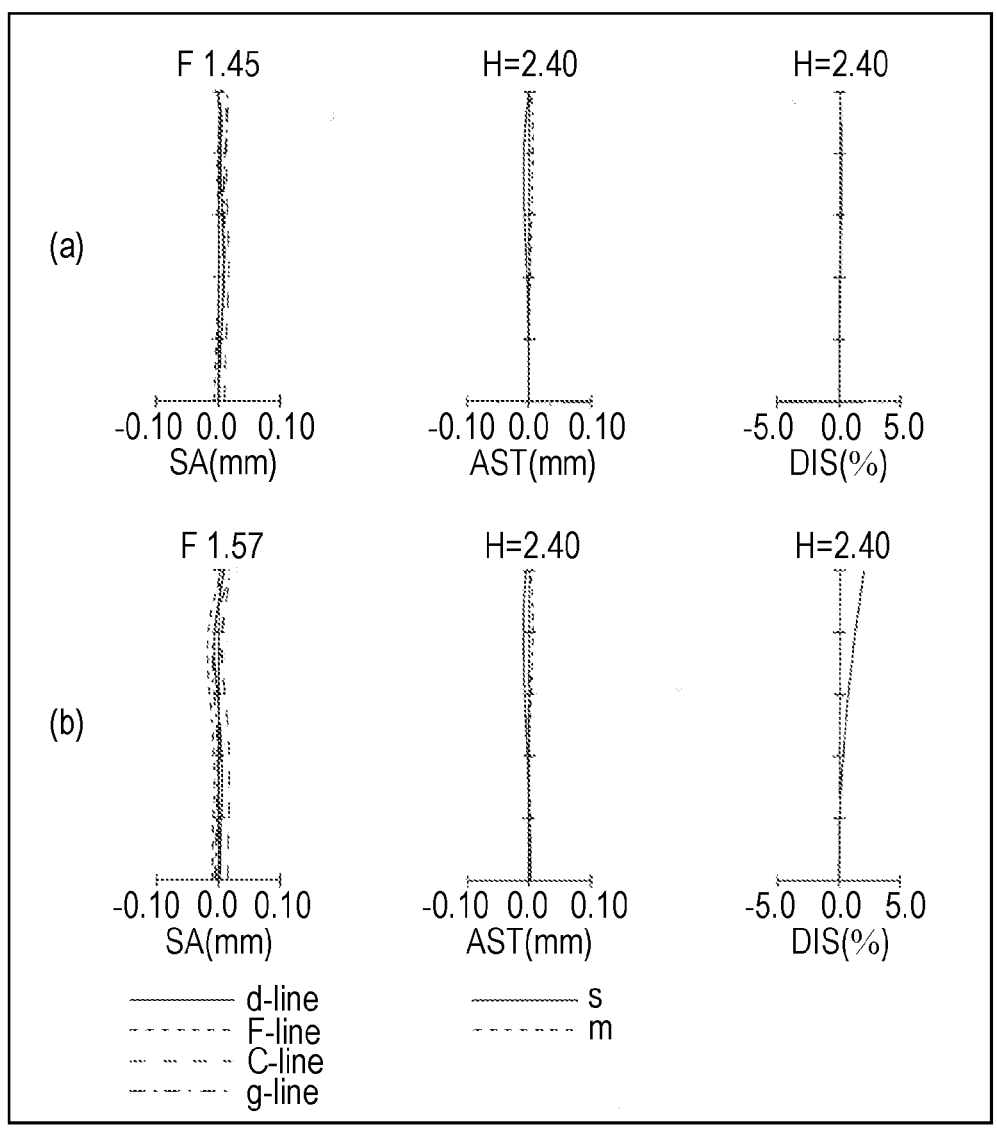
FIG. 8 is a longitudinal aberration diagram of the lens system according to the fourth numerical example in an infinity in-focus condition and a close-object in-focus condition.

As illustrated in FIG. 7, first lens group G1 includes, in order from an object side to an image side, positive meniscus first lens element L1 with a convex surface facing the object side, positive meniscus second lens element L2 with a convex surface facing the object side, negative meniscus third lens element L3 with a convex surface facing the object side, and positive meniscus fourth lens element L4 with a convex surface facing the object side. Among these lens elements, third lens element L3 and fourth lens element L4 are joined to each other. In first lens group G1, aperture diaphragm A is disposed on the image surface side with respect to fourth lens element L4.

Second lens group G2 includes only fifth lens element L5 having the same shape as fifth lens element L5 of the first exemplary embodiment.

Third lens group G3 includes only bi-convex sixth lens element L6.

Fourth lens group G4 includes only negative meniscus seventh lens element L7 with a convex surface facing the object side.

Fifth lens group G5 includes, in order from the object side to the image side, bi-convex eighth lens element L8 and bi-concave ninth lens element L9.

In the lens system according to the fourth exemplary embodiment, in focusing from an infinity in-focus condition to a close-object in-focus condition, second lens group G2 serves as a first focus lens group that moves toward the image side along an optical axis, and fourth lens group G4 serves as a second focus lens group that moves toward the image side along the optical axis.

Fifth Exemplary Embodiment

Figure 9:
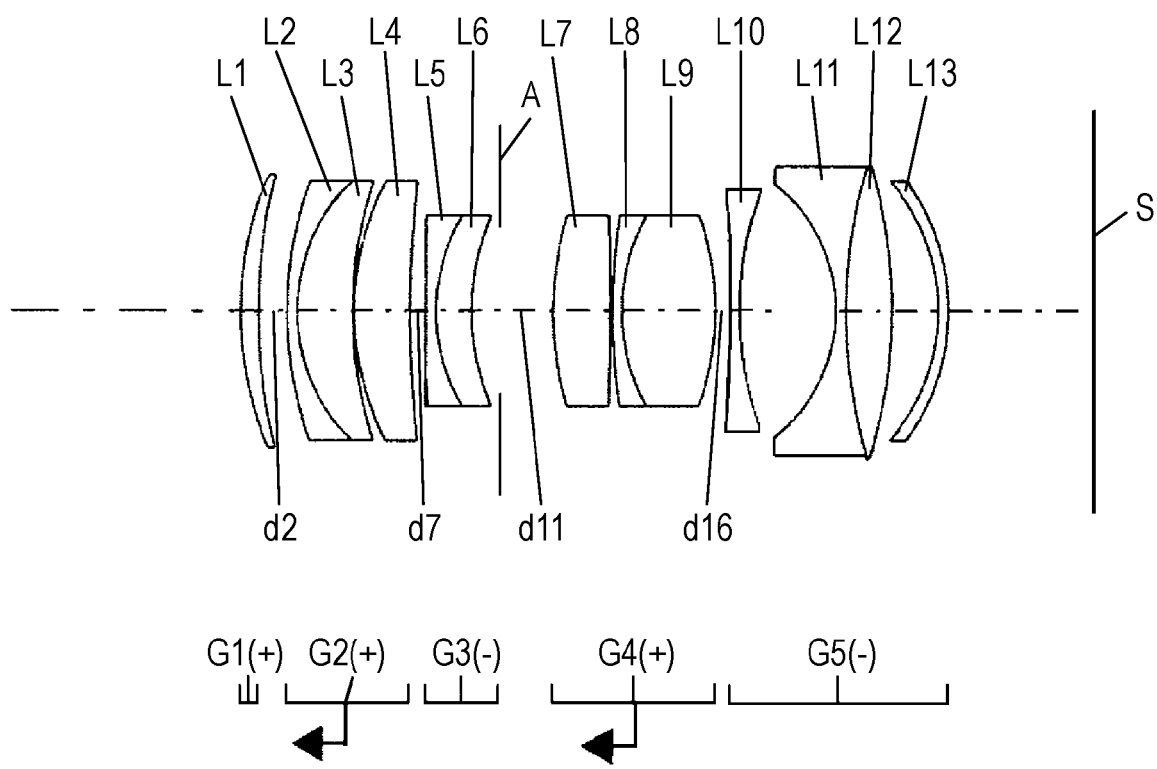
FIG. 9 is a lens arrangement diagram illustrating a lens system according to a fifth exemplary embodiment (fifth numerical example)
Figure 10:
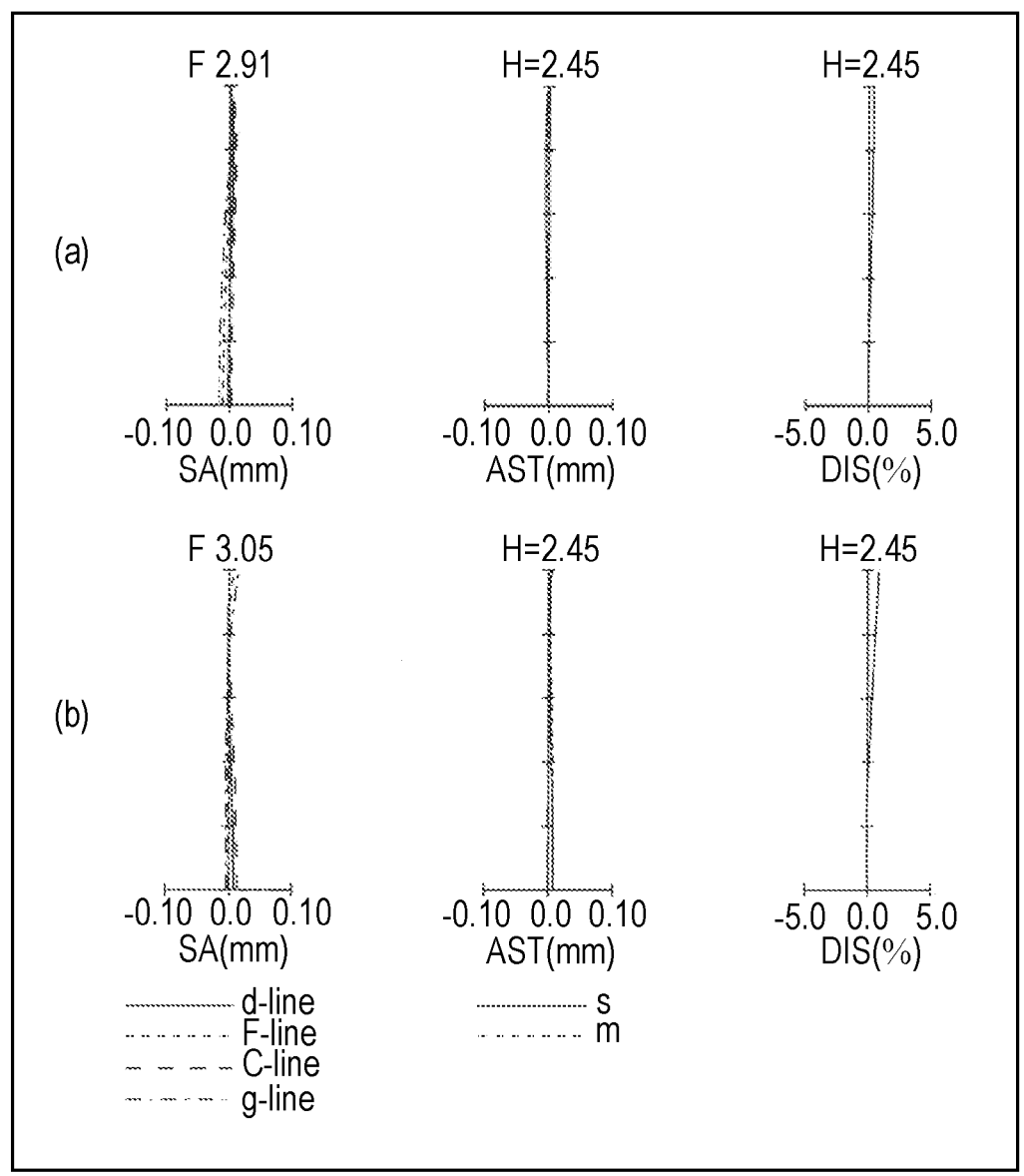
FIG. 10 is a longitudinal aberration diagram of the lens system according to the fifth numerical example in an infinity in-focus condition and a close-object in-focus condition.

As illustrated in FIG. 9, first lens group G1 includes only positive meniscus first lens element L1 with a convex surface facing an object side.

Second lens group G2 includes, in order from the object side to an image side, negative meniscus second lens element L2 with a convex surface facing the object side, positive meniscus third lens element L3 with a convex surface facing the object side, and positive meniscus fourth lens element L4 with a convex surface facing the object side. Among these lens elements, second lens element L2 and third lens element L3 are joined to each other.

Third lens group G3 includes, in order from the object side to the image side, bi-concave fifth lens element L5 and positive meniscus sixth lens element L6 with a convex surface facing the object side. Fifth lens element L5 and sixth lens element L6 are joined to each other. In third lens group G3, aperture diaphragm A is disposed on the image surface side with respect to sixth lens element L6.

Fourth lens group G4 includes, in order from the object side to the image side, bi-convex seventh lens element L7, negative meniscus eighth lens element L8 with a convex surface facing the object side, and bi-convex ninth lens element L9. Among these lens elements, eighth lens element L8 and ninth lens element L9 are joined to each other.

Fifth lens group G5 includes, in order from the object side to the image side, bi-concave tenth lens element L10, bi-concave eleventh lens element L11, bi-convex twelfth lens element L12, and negative meniscus thirteenth lens element L13 with a convex surface facing the image surface side. Among these lens elements, eleventh lens element L11 and twelfth lens element L12 are joined to each other.

In the lens system according to the fifth exemplary embodiment, in focusing from an infinity in-focus condition to a close-object in-focus condition, second lens group G2 serves as a first focus lens group that moves toward the object side along an optical axis, and fourth lens group G4 serves as a second focus lens group that moves toward the object side along the optical axis.

Sixth Exemplary Embodiment

Figure 11:
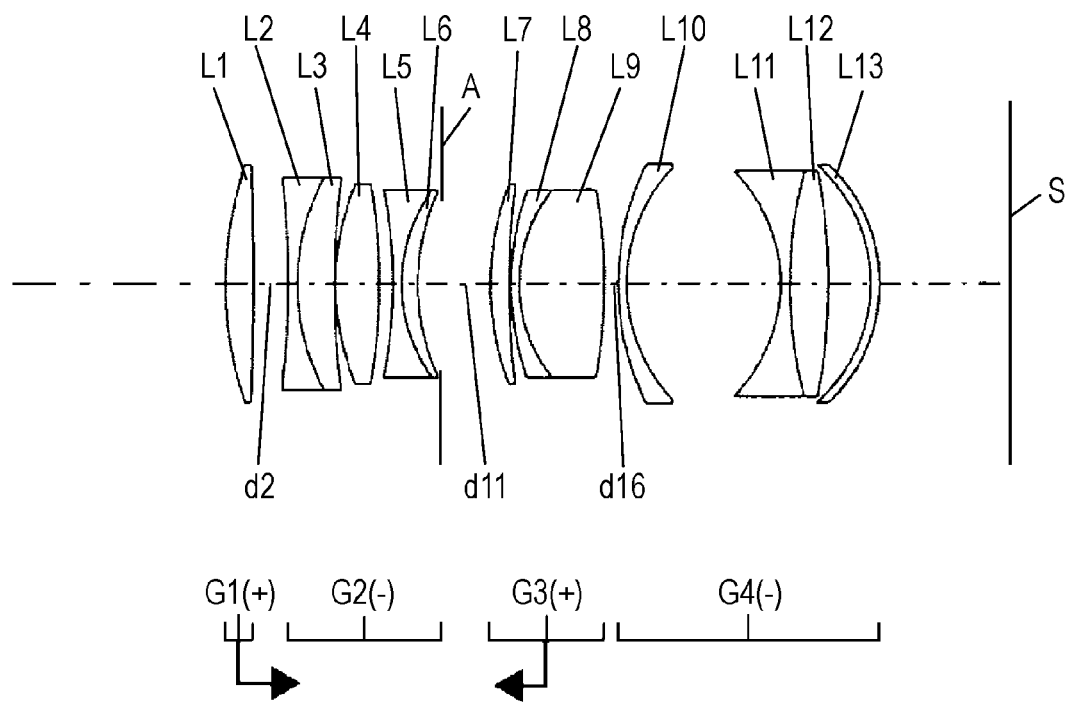
FIG. 11 is a lens arrangement diagram illustrating a lens system according to a sixth exemplary embodiment (sixth numerical example)
Figure 12:
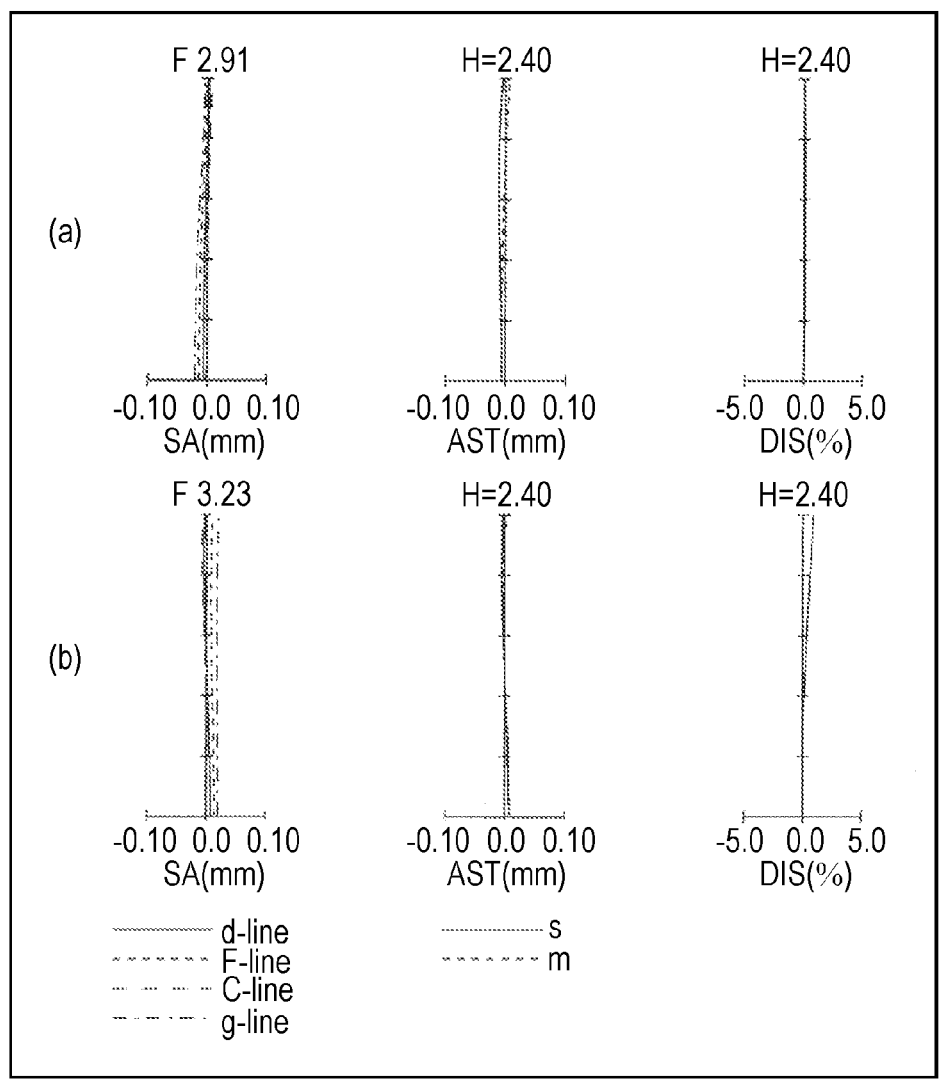
FIG. 12 is a longitudinal aberration diagram of the lens system according to the sixth numerical example in an infinity in-focus condition and a close-object in-focus condition.

As illustrated in FIG. 11, first lens group G1 includes only bi-convex first lens element L1.

Second lens group G2 includes, in order from an object side to an image side, bi-concave second lens element L2, positive meniscus third lens element L3 with a convex surface facing the object side, bi-convex fourth lens element L4, bi-concave fifth lens element L5, and positive meniscus sixth lens element L6 with a convex surface facing the object side. Among these lens elements, second lens element L2 and third lens element L3 are joined to each other. Further, fifth lens element L5 and sixth lens element L6 are joined to each other. In second lens group G2, aperture diaphragm A is disposed on the image surface side with respect to sixth lens element L6.

Third lens group G3 includes, in order from the object side to the image side, positive meniscus seventh lens element L7 with a convex surface facing the object side, negative meniscus eighth lens element L8 with a convex surface facing the object side, and bi-convex ninth lens element L9. Among these lens elements, eighth lens element L8 and ninth lens element L9 are joined to each other.

Fourth lens group G4 includes, in order from the object side to the image side, negative meniscus tenth lens element L10 with a convex surface facing the object side, bi-concave eleventh lens element L11, bi-convex twelfth lens element L12, and negative meniscus thirteenth lens element L13 with a convex surface facing the image surface side. Among these lens elements, eleventh lens element L11 and twelfth lens element L12 are joined to each other.

In the lens system according to the sixth exemplary embodiment, in focusing from an infinity in-focus condition to a close-object in-focus condition, first lens group G1 serves as a first focus lens group that moves toward the image side along an optical axis, and third lens group G3 serves as a second focus lens group that moves toward the object side along the optical axis.

Seventh Exemplary Embodiment

Figure 13:
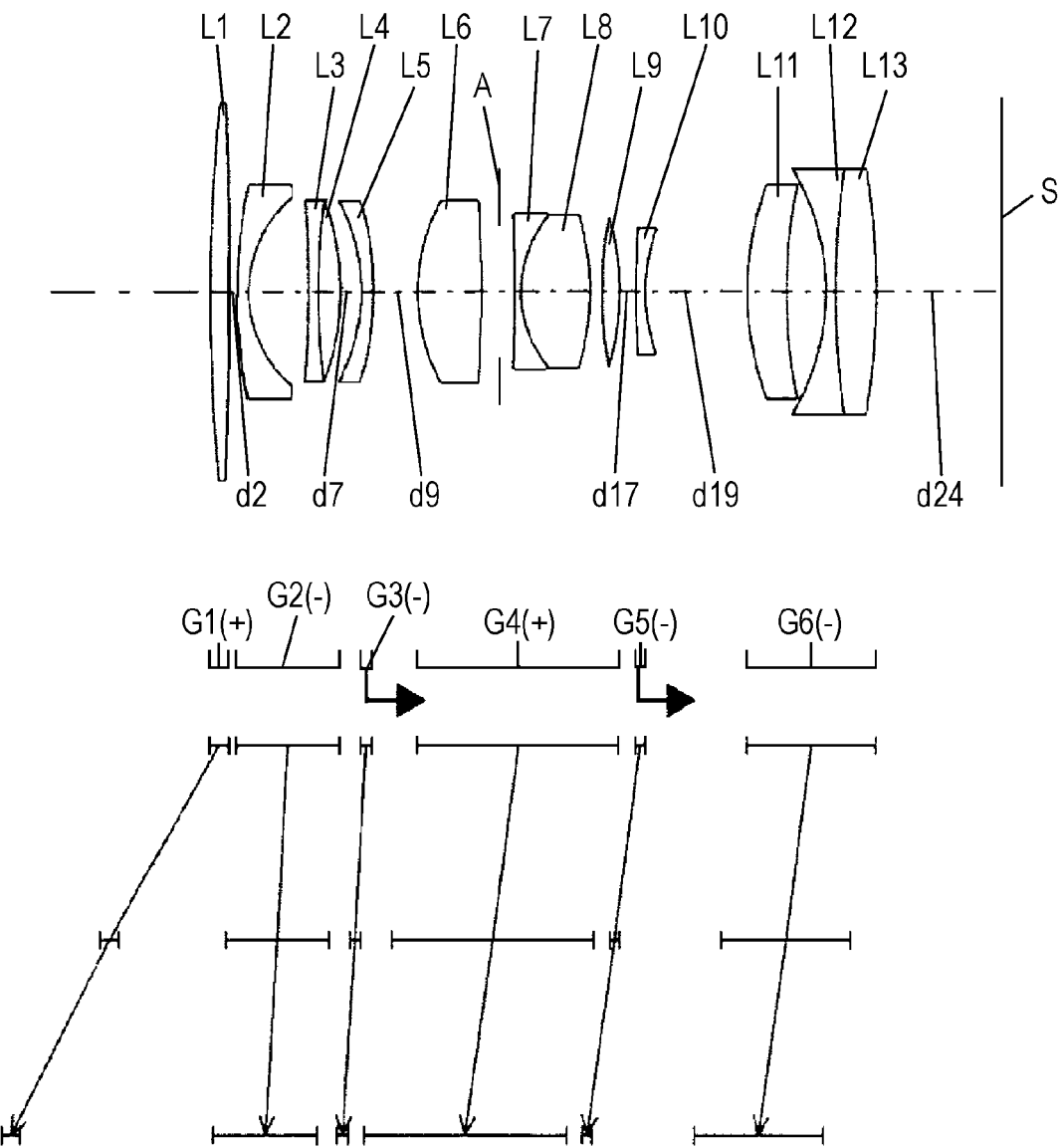
FIG. 13 is a lens arrangement diagram illustrating a zoom lens system according to a seventh exemplary embodiment (seventh numerical example) in an infinity in-focus condition.

FIG. 13 is a diagram illustrating lens arrangement at a wide angle end (a shortest focal length condition: focal length fW) of a zoom lens system according to a seventh exemplary embodiment and positions of lens groups at the wide angle end, an intermediate position (an intermediate focal length condition: focal length fM=√(fW*fT)), and a telephoto end (a longest focal length condition: focal length fT). FIG. 13 illustrates the zoom lens system in an infinity in-focus condition. Polygonal line arrows are straight lines each of which is obtained by connecting positions of each lens group at, in order from top, the wide angle end, the intermediate position, and the telephoto end.

The wide angle end and the intermediate position are simply connected through a straight line. Also, the intermediate position and the telephoto end are simply connected through a straight line. Thus, an actual movement of each lens group differs from a movement indicated by the illustrated line. In FIG. 13, an arrow attached to a lens group indicates a direction along which the lens group moves in focusing from an infinity in-focus condition to a close-object in-focus condition.

In FIG. 13, a plus sign (+) or minus sign (−) attached to a mark of each lens group corresponds to a sign of power of the lens group.

Further, in FIG. 13, a straight line located on a most right-hand side indicates a position of image surface S.

As illustrated in FIG. 13, first lens group G1 includes only biconvex first lens element L1.

Second lens group G2 includes, in order from an object side to an image side, negative meniscus second lens element L2 with a convex surface facing the object side, biconcave third lens element L3, and biconvex fourth lens element L4. Among these lens elements, third lens element L3 and fourth lens element L4 are joined to each other.

Third lens group G3 includes only negative meniscus fifth lens element L5 with a convex surface facing the image surface side.

Fourth lens group G4 includes, in order from the object side to the image side, biconvex sixth lens element L6, bi-concave seventh lens element L7, bi-convex eighth lens element L8, and biconvex ninth lens element L9. Among these lens elements, seventh lens element L7 and eighth lens element L8 are joined to each other. In fourth lens group G4, aperture diaphragm A is disposed on the image surface side with respect to sixth lens element L6.

Fifth lens group G5 includes only negative meniscus tenth lens element L10 with a convex surface facing the object side.

Sixth lens group G6 includes, in order from the object side to the image side, positive meniscus eleventh lens element L11 with a convex surface facing the object side, biconcave twelfth lens element L12, and biconvex thirteenth lens element L13. Among these lens elements, twelfth lens element L12 and thirteenth lens element L13 are joined to each other.

In the lens system of the seventh exemplary embodiment, all the lens groups, specifically, first lens group G1 to sixth lens group G6 move to the object side from the wide angle end through the telephoto end during zooming in such a manner that a distance between first lens group G1 and second lens group G2 increases, while a distance between third lens group G3 and fourth lens group G4 decreases.

Further, in focusing from an infinity in-focus condition to a close-object in-focus condition, third lens group G3 serves as a first focus lens group that moves toward the image side along an optical axis, and fifth lens group G5 serves as a second focus lens group that moves toward the image side along the optical axis.

The lens system according to each of the first to seventh exemplary embodiments includes, in order from the object side to the image side, a front group including the first focus lens group that moves with respect to the image surface in focusing from an infinity in-focus condition to a close-object in-focus condition and a rear group including the second focus lens group that moves with respect to the image surface in focusing. Thus, fluctuation in spherical aberration associated with focusing is small. Accordingly, focusing can be performed with excellent imaging characteristics maintained.

In the lens system according to each of the first to seventh exemplary embodiments, a fixed lens group that is fixed with respect to the image surface in focusing is disposed between a plurality of focus lens groups. Thus, fluctuation in spherical aberration and image surface curvature associated with focusing is small. Accordingly, focusing can be performed with excellent imaging characteristics maintained.

In the lens system according to each of the first to seventh exemplary embodiments, the first focus lens group includes three or fewer lens elements, and the second focus lens group includes three or fewer lens elements. Thus, high-speed and silent focusing can be performed.

As described above, the first to seventh exemplary embodiments have been described as examples of the technique disclosed in the present application. However, the technique in the present disclosure is not limited to these exemplary embodiments. It is to be noted that the technique in the present disclosure can also be applied to embodiments with various modifications, replacements, additions, and omissions, appropriately.

Hereinbelow, for example, conditions that can be satisfied by a lens system like the lens systems according to the first to seventh exemplary embodiments will be described. Here, a plurality of possible conditions are defined for the lens system according to each of the exemplary embodiments. A configuration that satisfies all the plurality of conditions is most effective for the lens system. However, when an individual condition is satisfied, a lens system having the corresponding effect can be obtained.

For example, a lens system like the lens systems according to the first to seventh exemplary embodiments including a front group including a first focus lens group that moves with respect to an image surface in focusing from an infinity in-focus condition to a close-object in-focus condition; a rear group including a second focus lens group that moves with respect to the image surface in focusing, the front group and the rear group being located in order from an object side to an image side; a fixed lens group including at least one positive power lens element, the fixed lens group being located between the front group and the rear group and fixed with respect to the image surface in focusing; and an aperture diaphragm (hereinbelow, this lens configuration is referred to as a basic configuration of the exemplary embodiment) satisfies the following condition (1):

$$dPgF > 0.015 \qquad \text{condition(1)}$$

where dPgF is an anomalous dispersibility in a g-line and an F-line of the positive power lens element in the fixed lens group.

Condition (1) defines the anomalous dispersibility of the positive lens in the fixed lens group. When condition (1) is satisfied, correction of secondary spectrum in chromatic aberration is easily performed. On the other hand, when the anomalous dispersibility is less than a lower limit of condition (1), it is difficult to correct the secondary spectrum. Thus, it is difficult to achieve a high-performance lens system with less chromatic aberration from an infinity in-focus condition to a close-object in-focus condition. Further, it is difficult to reduce fluctuation in chromatic aberration on the optical axis associated with focusing.

When the following condition (1)-1 is satisfied, the above effect can be achieved more successfully.

$$dPgF > 0.035 \qquad \text{condition(1)-1}$$

For example, it is beneficial that the lens system having the basic configuration like the lens systems according to the first to seventh exemplary embodiments satisfies the following condition (2):

$$vd < 100 \qquad \text{condition(2)}$$

where vd is an Abbe number of the positive power lens element in the fixed lens group.

Condition (2) defines the Abbe number of the positive lens in the fixed lens group. When condition (2) is satisfied, correction of magnification chromatic aberration is easily performed. When the Abbe number exceeds an upper limit of condition (2), it is difficult to reduce fluctuation in the magnification chromatic aberration associated with focusing.

When the following condition (2)-1 is satisfied, the above effect can be achieved more successfully.

$$vd < 30 \qquad \text{condition(2)-1}$$

When the following condition (2)-2' is satisfied, the above effect can be achieved more successfully.

$$vd < 20 \qquad \text{condition(2)-2'}$$

For example, it is beneficial that the lens system having the basic configuration like the lens systems according to the first to seventh exemplary embodiments satisfies the following condition (3):

$$1 < L/f < 4 \qquad \text{condition(3)}$$

where

L is an optical overall length of the lens system, and
f is a focal length of the entire lens system.

Condition (3) defines a ratio between the optical overall length of the lens system (an air-converted distance between a lens surface located closest to the object and the image surface) and the focal length of the entire lens system. When condition (3) is satisfied, it is possible to reduce an increase in astigmatism while achieving size reduction of the lens system. When the ratio is less than a lower limit of condition (3), a power of the lens groups constituting the lens system becomes excessively strong, which makes it difficult to reduce occurrence of astigmatism. On the other hand, when the ratio exceeds an upper limit of condition (3), the optical overall length of the lens system becomes excessively long, which makes it difficult to achieve size reduction. Further, a diameter of each lens becomes excessively large, which makes it difficult to reduce occurrence of spherical aberration.

When the following condition (3)-1 is satisfied, the above effect can be achieved more successfully.

$$1.5 < L/f < 3 \qquad \text{condition(3)-1}$$

For example, it is beneficial that the lens system having the basic configuration like the lens systems according to the first to seventh exemplary embodiments satisfies the following condition (4):

$$2<L/H<8 \qquad \text{condition(4)}$$

where
  L is the optical overall length of the lens system, and
  H is an image height of the lens system.

Condition (4) defines a ratio between the optical overall length of the lens system and the image height of the lens system. When condition (4) is satisfied, it is possible to easily perform correction of image surface curvature and, at the same time, to achieve size reduction of the lens system. When the ratio is less than a lower limit of condition (4), the power of the lens groups constituting the lens system becomes excessively strong, which makes it difficult to reduce occurrence of image surface curvature. On the other hand, when the ratio exceeds an upper limit of condition (4), the optical overall length of the lens system becomes excessively long, which makes it difficult to achieve size reduction. Further, the diameter of each lens element becomes large, which makes it difficult to reduce occurrence of spherical aberration.

When the following condition (4)-1 is satisfied, the above effect can be achieved more successfully.

$$5<L/H<7 \qquad \text{condition(4)-1}$$

For example, it is beneficial that the lens system having the basic configuration like the lens systems according to the first to seventh exemplary embodiments satisfies the following condition (5):

$$1<L \times Fno/f<15 \qquad \text{condition (5)}$$

where
  L is the optical overall length of the lens system,
  Fno is an F number of the lens system, and
  f is the focal length of the entire lens system.

Condition (5) defines a relationship between the optical overall length of the lens system, the F number of the lens system, and the focal length of the entire lens system. When condition (5) is satisfied, it is possible to appropriately set the power of each of the lens groups constituting the lens system, which makes it easy to control spherical aberration and, at the same time, to achieve size reduction of the lens system. When the relationship is less than a lower limit of condition (5), the power of the lens groups constituting the lens system becomes excessively strong, which makes it difficult to reduce occurrence of spherical aberration. On the other hand, when the relationship exceeds an upper limit of condition (5), the optical overall length of the lens system becomes excessively long, which makes it difficult to achieve size reduction. Further, the diameter of each lens becomes excessively large, which makes it difficult to reduce occurrence of spherical aberration.

When the following condition (5)-1 is satisfied, the above effect can be achieved more successfully.

$$1.3<L \times Fno/f<4 \qquad \text{condition(5)-1}$$

For example, it is beneficial that the lens system having the basic configuration like the lens systems according to the first to seventh exemplary embodiments satisfies the following condition (6):

$$0.05<BF/f<2 \qquad \text{condition(6)}$$

where
  BF is a back focus of the lens system, and
  f is the focal length of the entire lens system.

Condition (6) defines a ratio between the back focus of the lens system (an air-converted distance on the optical axis between a lens surface of a lens element located closest to the image and the image surface) and the focal length of the entire lens system. When condition (6) is satisfied, it is possible to appropriately set the power of the lens groups, which makes it easy to reduce astigmatism. When the ratio is less than a lower limit of condition (6), the back focus becomes excessively short and the power of the lens groups becomes strong, which makes it difficult to reduce occurrence of astigmatism. On the other hand, when the ratio exceeds an upper limit of condition (6), the back focus becomes excessively long with respect to the focal length of the entire lens system, which makes it difficult to reduce occurrence of spherical aberration.

When the following condition (6)-1 is satisfied, the above effect can be achieved more successfully.

$$0.1<BF/f<0.3 \qquad \text{condition(6)-1}$$

For example, it is beneficial that the lens system having the basic configuration like the lens systems according to the first to seventh exemplary embodiments satisfies the following condition (7):

$$0.5<BF/H<1.5 \qquad \text{condition(7)}$$

where
  BF is the back focus of the lens system, and
  H is the image height of the lens system.

Condition (7) defines a ratio between the back focus of the lens system and the image height of the lens system. When condition (7) is satisfied, it is possible to appropriately set the power of each of the lens groups, which makes it easy to reduce image surface curvature. When the ratio is less than a lower limit of condition (7), the back focus becomes excessively short and the power of the lens groups becomes strong, which makes it difficult to reduce occurrence of image surface curvature. On the other hand, when the ratio exceeds an upper limit of condition (7), the back focus becomes excessively long with respect to the image height of the entire lens system, which makes it difficult to reduce occurrence of spherical aberration.

When the following condition (7)-1 is satisfied, the above effect can be achieved more successfully.

$$0.6<BF/H<1.1 \qquad \text{condition(7)-1}$$

For example, it is beneficial that the lens system having the basic configuration like the lens systems according to the first to seventh exemplary embodiments satisfies the following condition (8):

$$0.5<THs/f<1.8 \qquad \text{condition(8)}$$

where
  THs is a distance on the optical axis between the aperture diaphragm and the image surface, and
  f is the focal length of the entire lens system.

The condition (8) defines a ratio between the distance between the aperture diaphragm and the image surface and the focal length of the entire lens system. When condition (8) is satisfied, distortion is easily reduced. When the ratio is less than a lower limit of condition (8), the distance between the aperture diaphragm and the image surface becomes excessively short and the power of the lens groups becomes strong, which makes it difficult to reduce occurrence of distortion. On the other hand, when the ratio exceeds an upper limit of condition (8), the distance between the aperture diaphragm and the image surface becomes excessively long and the lens diameter becomes large, which makes it difficult to reduce occurrence of spherical aberration.

When the following condition (8)-1 is satisfied, the above effect can be achieved more successfully.

$$0.7<THs/f<1.7 \qquad \text{condition(8)-1}$$

For example, it is beneficial that the lens system having the basic configuration like the lens systems according to the first to seventh exemplary embodiments satisfies the following condition (9):

$$3<THs \times Fno/H<19 \qquad \text{condition(9)}$$

where

THs is the distance on the optical axis between the aperture diaphragm and the image surface, Fno is the F number of the lens system, and H is the image height of the lens system.

Condition (9) defines a relationship between the distance between the aperture diaphragm and the image surface, the F number of the lens system, and the image height. When condition (9) is satisfied, spherical aberration and distortion are easily reduced. When the relationship is less than a lower limit of condition (9), the distance between the aperture diaphragm and the image surface becomes excessively short and the power of the lens groups becomes strong, which makes it difficult to reduce occurrence of spherical aberration and distortion. On the other hand, when the relationship exceeds an upper limit of condition (9), the distance between the aperture diaphragm and the image surface becomes excessively long and the lens diameter becomes large, which makes it difficult to reduce occurrence of spherical aberration.

When the following condition (9)-1 is satisfied, the above effect can be achieved more successfully.

$$4<THs \times Fno/H<7 \qquad \text{condition(9)-1}$$

For example, it is beneficial that the lens system having the basic configuration like the lens systems according to the first to seventh exemplary embodiments satisfies the following condition (10):

$$0.1<|THs/f_{FIX}|<4 \qquad \text{condition(10)}$$

where

THs is the distance on the optical axis between the aperture diaphragm and the image surface, and $f_{FIX}$ is a focal length of the fixed lens group that is located between the first and second focus lens groups and fixed in focusing.

Condition (10) defines a ratio between the distance between the aperture diaphragm and the image surface and the focal length of the fixed lens group that is located between the first and second focus lens groups and fixed in focusing. When condition (10) is satisfied, spherical aberration is easily reduced. When the ratio is less than a lower limit of condition (10), the distance between the aperture diaphragm and the image surface becomes excessively short and a power of the fixed lens group becomes excessively strong, which makes it difficult to reduce occurrence of astigmatism. On the other hand, when the ratio exceeds an upper limit of condition (10), the distance between the aperture diaphragm and the image surface becomes excessively long and the lens diameter becomes large, which makes it difficult to reduce occurrence of spherical aberration.

When the following condition (10)-1 is satisfied, the above effect can be achieved more successfully.

$$0.2<|THs/f_{FIX}|<1 \qquad \text{condition(10)-1}$$

For example, it is beneficial that the lens system having the basic configuration like the lens systems according to the first to seventh exemplary embodiments satisfies the following condition (11):

$$0.1<TH_{AIRMAX}/f<4 \qquad \text{condition(11)}$$

where $TH_{AIRMAX}$ is a maximum air space on the optical axis of the lens system (excepting the back focus), and f is the focal length of the entire lens system.

Condition (11) defines a ratio between the maximum air space on the optical axis of the lens system (a distance between the lens elements, excepting the back focus) and the focal length of the entire lens system. When condition (11) is satisfied, the lens elements can be arranged with appropriate air spaces therebetween, which makes it easy to control astigmatism. When the ratio is less than a lower limit of condition (11), the distance between the lens elements becomes excessively short, which makes it difficult to reduce occurrence of astigmatism. On the other hand, when the ratio exceeds an upper limit of condition (11), the distance between the lens elements becomes excessively long and the lens diameter becomes large, which makes it difficult to reduce occurrence of spherical aberration.

When the following condition (11)-1 is satisfied, the above effect can be achieved more successfully.

$$0.2<TH_{AIRMAX}/f<0.5 \qquad \text{condition(11)-1}$$

For example, it is beneficial that the lens system having the basic configuration like the lens systems according to the first to seventh exemplary embodiments satisfies the following condition (12):

$$0.5<TH_{AIRMAX} \times Fno/H<8 \qquad \text{condition(12)}$$

where $TH_{AIRMAX}$ is the maximum air space on the optical axis of the lens system (excepting the back focus), Fno is the F number of the lens system, and H is the image height of the lens system.

Condition (12) defines a relationship between the maximum air space on the optical axis of the lens system (the distance between the lens elements, excepting the back focus), the F number of the lens system, and the image height. When condition (12) is satisfied, the lens elements can be arranged with appropriate air spaces therebetween, which makes it easy to control astigmatism. When the relationship is less than a lower limit of the condition (12), the distance between the lens elements becomes excessively short, which makes it difficult to reduce occurrence of spherical aberration and astigmatism. On the other hand, when the relationship exceeds an upper limit of the condition (12), the distance between the lens elements becomes excessively long and the lens diameter becomes large, which makes it difficult to reduce occurrence of spherical aberration.

When the following condition (12)-1 is satisfied, the above effect can be achieved more successfully.

$$0.8<TH_{AIRMAX} \times Fno/H<1.7 \qquad \text{condition (12)-1}$$

For example, it is beneficial that the lens system having the basic configuration like the lens systems according to the first to seventh exemplary embodiments includes two or more positive lenses that satisfy condition (1) in the fixed lens group.

When the fixed lens group includes two or more positive lenses that satisfy condition (1), secondary spectrum is easily controlled.

The lens groups constituting the lens systems according to the first to seventh exemplary embodiments each include only refractive type lens elements which deflect incident light by refraction (that is, lens elements of a type in which deflection is performed at an interface between media having different refractive indices). However, the present disclosure is not limited to this configuration. For example, each of the lens groups may include diffractive type lens elements which deflect incident light by diffraction, refractive-diffractive hybrid type lens elements which deflect incident light by a combination of diffraction and refraction, or refractive index distribution type lens elements which deflect incident light by distribution of refractive index in a medium. In particular, in the refractive-diffractive hybrid type lens element, when a diffraction structure is formed in an interface between media having different refractive indices, wavelength dependence of a diffraction efficiency is improved.

The lens elements constituting the lens systems according to the first to seventh exemplary embodiments may be hybrid lenses each of which is prepared by joining a transparent resin layer made of ultraviolet-ray curable resin onto a surface of a lens element made of glass. In this case, a power of the transparent resin layer is weak. Thus, the glass lens element and the transparent resin layer are totally regarded as one lens element. Similarly, when a lens element having a refractive power close to a refractive power of a flat plate is disposed, the lens element is regarded as zero lens element because the power of the lens element is weak.

Eighth Exemplary Embodiment

Figure 16:
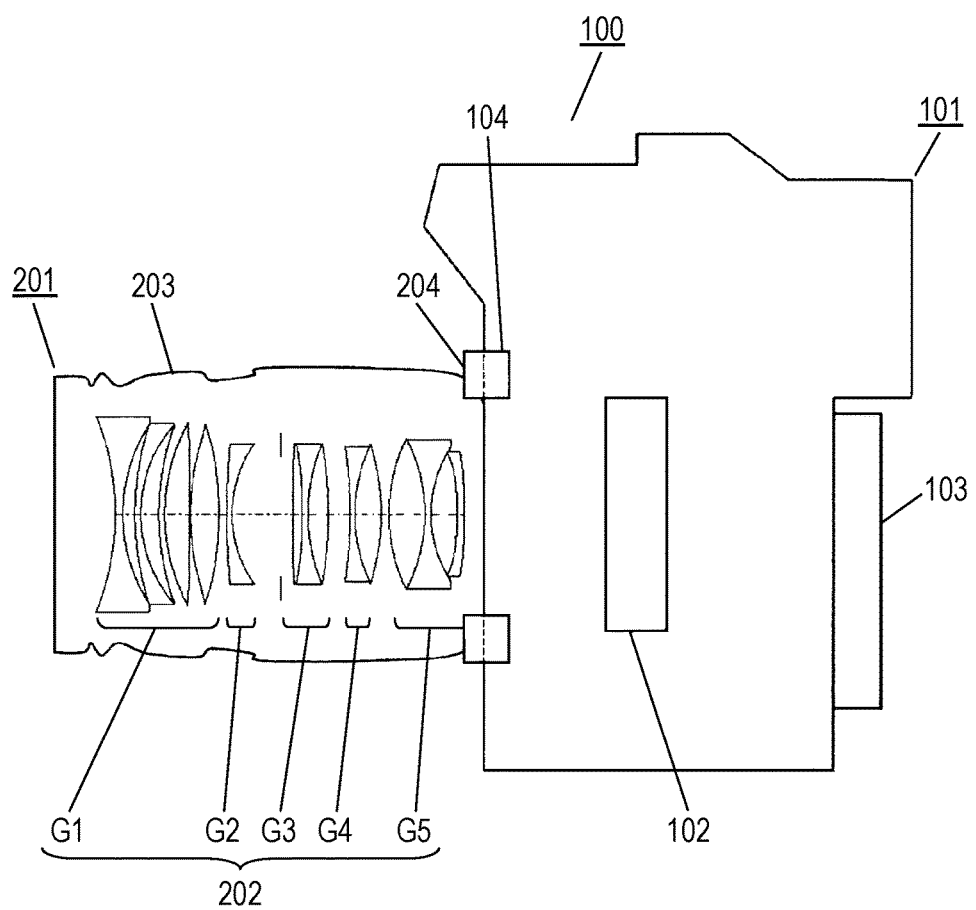
FIG. 16 is a schematic configuration diagram of a camera system according to an eighth exemplary embodiment.

FIG. 16 is a schematic configuration diagram of a camera system according to an eighth exemplary embodiment.

Camera system 100 according to the eighth exemplary embodiment includes camera body 101 and interchangeable lens apparatus 201 which is detachably connected to camera body 101.

Camera body 101 includes image sensor 102 which receives an optical image formed by lens system 202 of interchangeable lens apparatus 201 and converts the optical image into an electric image signal, liquid crystal monitor 103 which displays the image signal converted by image sensor 102, and camera mount part 104. On the other hand, interchangeable lens apparatus 201 includes lens system 202 according to any one of the first to seventh exemplary embodiments, lens barrel 203 which holds lens system 202, and lens mount part 204 which is connected to camera mount part 104 of camera body 101. Camera mount part 104 and lens mount part 204 are physically connected to each other. In addition, camera mount part 104 and lens mount part 204 function as interfaces which allow camera body 101 and interchangeable lens apparatus 201 to exchange signals by electrically connecting a controller (not illustrated) in camera body 101 and a controller (not illustrated) in interchangeable lens apparatus 201. In FIG. 16, the lens system according to the first exemplary embodiment is used as lens system 202.

In the eighth exemplary embodiment, since lens system 202 according to any one of the first to seventh exemplary embodiments is used, a compact interchangeable lens apparatus having excellent imaging performance can be achieved at low cost. Further, size reduction and cost reduction of the entire camera system 100 according to the eighth exemplary embodiment can be achieved.

In the camera system according to the eighth exemplary embodiment, the lens systems according to the first to seventh exemplary embodiments are shown as lens system 202, and the entire focusing range is not required to be used in these lens systems. That is, in accordance with a desired focusing range, a range where a sufficient optical performance is ensured may exclusively be used.

An imaging device that includes the lens system according to any one of the first to seventh exemplary embodiments and an image sensor such as a CCD or a CMOS may be applied to, for example, a camera for a mobile information terminal such as a smartphone, a surveillance camera in a surveillance system, a Web camera, or an onboard camera.

As described above, the eighth exemplary embodiment has been described as an example of the technique disclosed in the present application. However, the technique in the present disclosure is not limited to the eight exemplary embodiment. It is to be noted that the technique in the present disclosure can also be applied to embodiments with various modifications, replacements, additions, and omissions, appropriately.

Hereinbelow, numerical examples in which the lens systems according to the first to seventh exemplary embodiments are specifically implemented will be described. In the numerical examples, units of length are all "mm", and units of view angle are all "°". Further, in the numerical examples, r is a radius of curvature, d is a surface distance, nd is a refractive index to a d-line, and vd is an Abbe number to the d-line. In the numerical examples, surfaces marked with * are aspherical surfaces, and an aspherical surface shape is defined by the following expression.

$$Z = \frac{h^2/r}{1+\sqrt{1-(1+\kappa)(h/r)^2}} + \sum A_n h^n \qquad \text{[Expression 1]}$$

FIGS. 2, 4, 6, 8, 10, and 12 are longitudinal aberration diagrams of the lens systems according to the first to sixth exemplary embodiments, respectively.

In each of the longitudinal aberration diagrams, (a) shows the aberration in an infinity in-focus condition, and (b) shows the aberration in a close-object in-focus condition. Each of the longitudinal aberration diagrams shows, in order from a left-hand side, the spherical aberration (SA (mm)), the astigmatism (AST (mm)), and the distortion (DIS (%)). In each spherical aberration diagram, a vertical axis represents the F-number (indicated by F in the drawing), and a solid line, a short broken line, a long broken line, and a dot-dash line indicate characteristics to the d-line, the F-line, a C-line, and the g-line, respectively. In each astigmatism diagram, a vertical axis represents the image height (indicated by H in the drawing), and a solid line and a broken line indicate characteristics to a sagittal plane (indicated by s in the drawing) and a meridional plane (indicated by m in the drawing), respectively. In each distortion diagram, a vertical axis represents the image height (indicated by H in the drawing).

Figure 14:
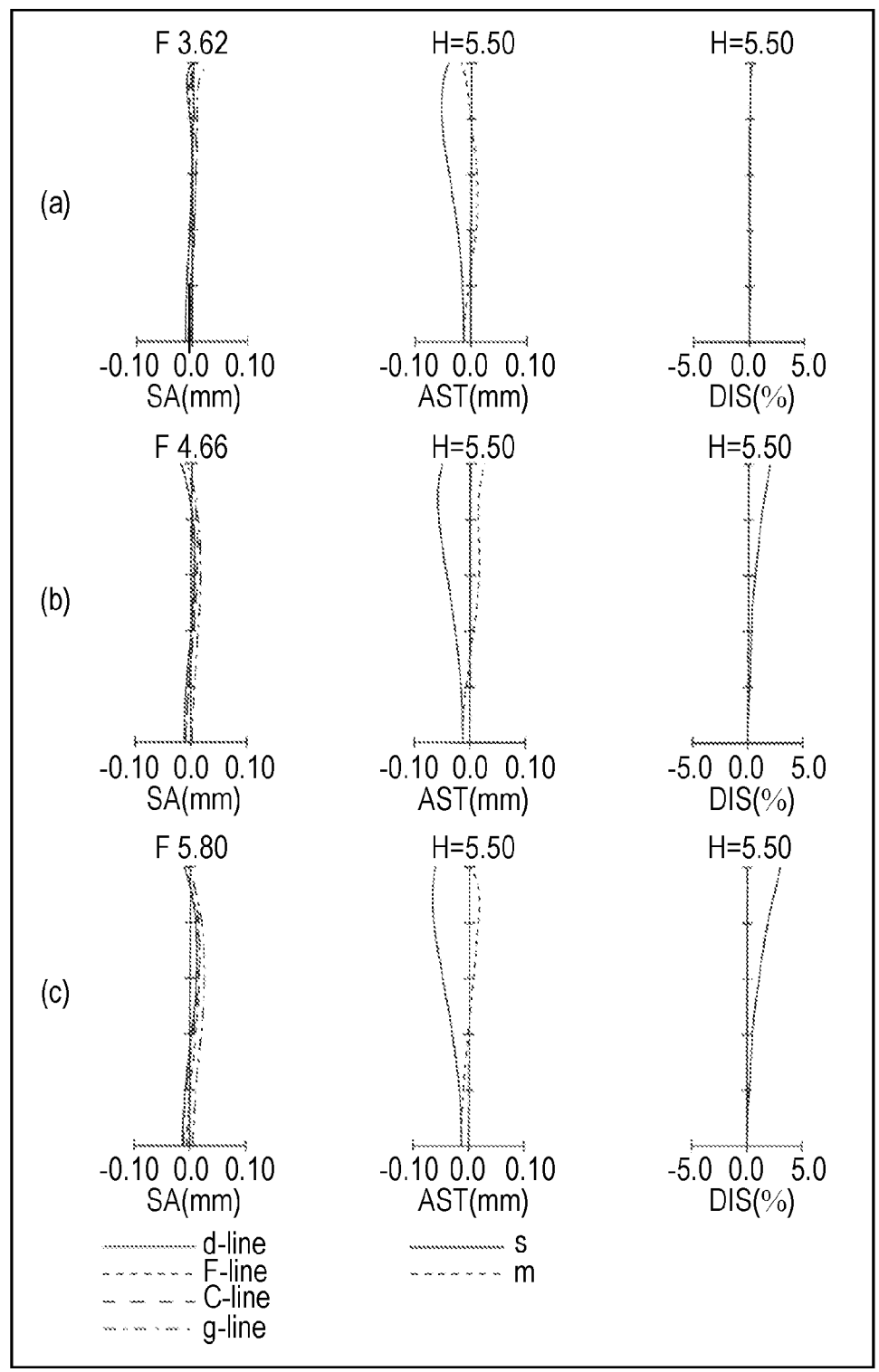
FIG. 14 is a longitudinal aberration diagram of the zoom lens system according to the seventh exemplary embodiment (seventh numerical example) in the infinity in-focus condition.
Figure 15:
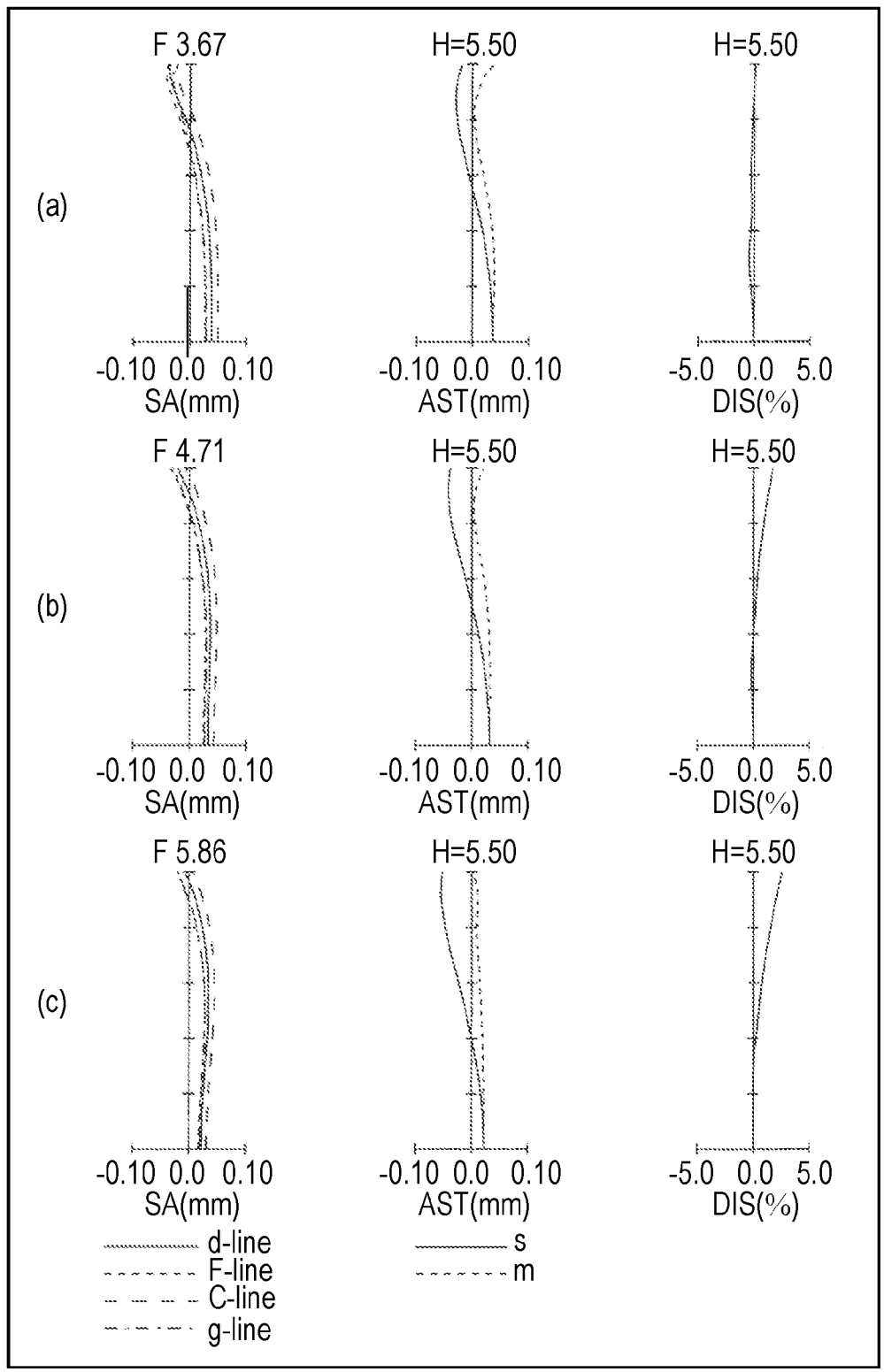
FIG. 15 is a longitudinal aberration diagram of the zoom lens system according to the seventh exemplary embodiment (seventh numerical example) in a close-object in-focus condition.

FIGS. 14 and 15 are longitudinal aberration diagrams of the lens system according to the seventh exemplary embodiment. In the longitudinal aberration diagram of FIG. 14, (a) shows a wide angle end infinity in-focus condition, (b) shows an intermediate position infinity in-focus condition, and (c) shows a telephoto end infinity in-focus condition. In the longitudinal aberration diagram of FIG. 15, (a) shows a wide angle end close-object in-focus condition, (b) shows an intermediate position close-object in-focus condition, and (c) shows a telephoto end close-object in-focus condition. Each of the longitudinal aberration diagrams of FIGS. 14 and 15 shows, in order from a left-hand side, the spherical aberration (SA (mm)), the astigmatism (AST (mm)), and the distortion (DIS (%)). In each spherical aberration diagram, a vertical axis represents the F-number (indicated by F in the drawing), and a solid line, a short broken line, a long broken line, and a dot-dash line indicate characteristics to the d-line, the F-line, the C-line, and the g-line, respectively. In each astigmatism diagram, a vertical axis represents the image height (indicated by H in the drawing), and a solid line and a broken line indicate characteristics to the sagittal plane (indicated by s in the drawing) and the meridional plane (indicated by m in the drawing), respectively. In each distortion diagram, a vertical axis represents the image height (indicated by H in the drawing).

First Numerical Example

The lens system of the first numerical example corresponds to the first exemplary embodiment illustrated in FIG. 1. FIGS. 17, 18, 19, and 20 show surface data, aspherical data, various data, and lens group data of the lens system of the first numerical example, respectively.

Second Numerical Example

The lens system of the second numerical example corresponds to the second exemplary embodiment illustrated in FIG. 3. FIGS. 21, 22, 23, and 24 show surface data, aspherical data, various data, and lens group data of the lens system of the second numerical example, respectively.

Third Numerical Example

The lens system of the third numerical example corresponds to the third exemplary embodiment illustrated in FIG. 5. FIGS. 25, 26, 27, and 28 show surface data, aspherical data, various data, and lens group data of the lens system of the third numerical example, respectively.

Fourth Numerical Example

The lens system of the fourth numerical example corresponds to the fourth exemplary embodiment illustrated in FIG. 7. FIGS. 29, 30, 31, and 32 show surface data, aspherical data, various data, and lens group data of the lens system of the fourth numerical example, respectively.

Fifth Numerical Example

The lens system of the fifth numerical example corresponds to the fifth exemplary embodiment illustrated in FIG. 9. FIGS. 33, 34 and 35 show surface data, various data, and lens group data of the lens system of the fifth numerical example, respectively.

Sixth Numerical Example

The lens system of the sixth numerical example corresponds to the sixth exemplary embodiment illustrated in FIG. 11. FIGS. 36, 37 and 38 show surface data, various data, and lens group data of the lens system of the sixth numerical example, respectively.

Seventh Numerical Example

The lens system of the seventh numerical example corresponds to the seventh exemplary embodiment illustrated in FIG. 13. FIGS. 39, 40, 41, and 42 show surface data, aspherical data, various data, and zoom lens group data of the lens system of the seventh numerical example, respectively.

The following Table 1 shows corresponding values to the respective conditions in the lens system of each of the numerical examples.

TABLE 1

| | Condition corresponding values | | | | |
|---|---|---|---|---|---|
| | Example | | | | |
| | 1 | 2 | 3 | 4 | 5 |
| (1) | 0.0466 | 0.0466 | 0.0466 | 0.0564 | 0.0466 |
| (2) | 17.5 | 17.5 | 17.5 | 95.1 | 17.5 |
| (3) | 2.69 | 2.73 | 2.47 | 1.24 | 1.26 |
| (4) | 5.38 | 6.65 | 6.03 | 5.15 | 5.15 |
| (5) | 3.88 | 3.94 | 3.57 | 1.79 | 3.67 |
| (6) | 0.46 | 0.29 | 0.37 | 0.22 | 0.22 |
| (7) | 0.91 | 0.72 | 0.90 | 0.93 | 0.88 |
| (8) | 1.63 | 1.43 | 1.17 | 0.86 | 0.88 |
| (9) | 4.70 | 5.03 | 4.11 | 5.19 | 10.46 |
| (10) | 0.54 | 0.13 | 0.15 | 1.31 | 2.20 |
| (11) | 0.38 | 0.39 | 0.26 | 0.17 | 0.14 |
| (12) | 1.11 | 1.37 | 0.90 | 1.05 | 1.70 |

| | Example | | | |
|---|---|---|---|---|
| | 6 | 7-wide angle end | 7-intermediate position | 7-telephoto end |
| (1) | 0.0375 | 0.0375 | 0.0375 | 0.0375 |
| (2) | 81.6 | 81.6 | 81.6 | 81.6 |
| (3) | 1.26 | 2.50 | 2.49 | 2.42 |
| (4) | 5.23 | 4.55 | 5.16 | 5.73 |
| (5) | 3.66 | 9.06 | 11.61 | 14.05 |
| (6) | 0.21 | 0.40 | 0.42 | 0.43 |
| (7) | 0.87 | 0.73 | 0.87 | 1.03 |
| (8) | 0.91 | 1.59 | 1.46 | 1.35 |
| (9) | 11.03 | 10.46 | 14.12 | 18.47 |
| (10) | 2.37 | 2.82 | 2.96 | 3.11 |
| (11) | 0.25 | 0.32 | 0.29 | 0.46 |
| (12) | 3.01 | 2.12 | 2.82 | 6.36 |

As described above, the exemplary embodiments have been described as examples of the technique in the present disclosure. Thus, the accompanying drawings and detailed description have been provided.

Therefore, in order to illustrate the technique, not only essential elements, but also inessential elements may be included in the elements described in the accompanying drawings and in the detailed description. Therefore, such inessential elements should not be immediately determined as essential elements because of their presence in the accompanying drawings and in the detailed description.

Further, since the exemplary embodiments described above are merely examples of the technique in the present disclosure, various modifications, replacements, additions, and omissions can be performed within the scope of the claims or equivalents thereof.

The present disclosure is applicable to, for example, a digital still camera, a digital video camera, a camera for a mobile information terminal such as a smartphone, a surveillance camera in a surveillance system, a Web camera, or an onboard camera. In particular, the present disclosure is applicable to a photographing optical system that requires high image quality such as a digital still camera system and a digital video camera system.

What is claimed is:

1. A lens system comprising:
a front group including a first focus lens group that moves with respect to an image surface in focusing from an infinity in-focus condition to a close-object in-focus condition;
a rear group including a second focus lens group that moves with respect to the image surface in focusing from the infinity in-focus condition to the close-object in-focus condition, the front group and the rear group being located in order from an object side to an image side;
a fixed lens group including at least one positive power lens element, the fixed lens group being located between the front group and the rear group and fixed with respect to the image surface during focusing; and
an aperture diaphragm,
wherein the lens system satisfies the following condition (1):

$$dPgF > 0.015 \quad \text{condition (1)}$$

where dPgF is an anomalous dispersibility in a g-line and an F-line of the positive power lens element in the fixed lens group.

2. The lens system according to claim 1, wherein the first focus lens group includes three or fewer lens elements and the second focus lens group includes three or fewer lens elements.

3. The lens system according to claim 1, wherein, among lenses in the front group, the first focus lens group is located closest to the image side.

4. The lens system according to claim 1, wherein, among lenses in the rear group, the second focus lens group is located closest to the object side.

5. The lens system according to claim 1, wherein the lens system satisfies the following condition (2):

$$vd < 100 \quad \text{condition (2)}$$

where vd is an Abbe number of the positive power lens element in the fixed lens group.

6. The lens system according to claim 1, wherein the lens system satisfies the following condition (3):

$$1 < L/f < 4 \quad \text{condition (3)}$$

where
L is an optical overall length of the lens system, and
f is a focal length of an entire lens system in the infinity in-focus condition.

7. The lens system according to claim 1, wherein the lens system satisfies the following condition (4):

$$2 < L/H < 8 \quad \text{condition (4)}$$

where
L is an optical overall length of the lens system, and
H is an image height of the lens system.

8. The lens system according to claim 1, wherein the lens system satisfies the following condition (5):

$$1 < L \times Fno/f < 15 \quad \text{condition (5)}$$

where
L is an optical overall length of the lens system,
Fno is an F number of the lens system, and
f is a focal length of an entire lens system in the infinity in-focus condition.

9. The lens system according to claim 1, wherein the lens system satisfies the following condition (6):

$$0.05 < BF/f < 2 \quad \text{condition (6)}$$

where
BF is a back focus of the lens system, and
f is a focal length of an entire lens system in the infinity in-focus condition.

10. The lens system according to claim 1, wherein the lens system satisfies the following condition (7):

$$0.5 < BF/H < 1.5 \quad \text{condition (7)}$$

where
BF is a back focus of the lens system, and
H is an image height of the lens system.

11. The lens system according to claim 1, wherein the lens system satisfies the following condition (8):

$$0.5 < THs/f < 1.8 \quad \text{condition (8)}$$

where
THs is a distance on an optical axis between the aperture diaphragm and the image surface, and
f is a focal length of an entire lens system in the infinity in-focus condition.

12. The lens system according to claim 1, wherein the lens system satisfies the following condition (9):

$$3 < THs \times Fno/H < 19 \quad \text{condition (9)}$$

where
THs is a distance on an optical axis between the aperture diaphragm and the image surface,
Fno is an F number of the lens system, and
H is an image height of the lens system.

13. The lens system according to claim 1, wherein the lens system satisfies the following condition (10):

$$0.1 < |THs/f_{FIX}| < 4 \quad \text{condition (10)}$$

where
THs is a distance on an optical axis between the aperture diaphragm and the image surface, and
$f_{FIX}$ is a composite focal length of the fixed lens group.

14. The lens system according to claim 1, wherein the lens system satisfies the following condition (11):

$$0.1 < TH_{AIRMAX}/f < 4 \quad \text{condition (11)}$$

where
$TH_{AIRMAX}$ is a maximum air space, except a back focus, on an optical axis of the lens system, and
f is a focal length of an entire lens system in the infinity in-focus condition.

15. The lens system according to claim 1, wherein the lens system satisfies the following condition (12):

$$0.5 < TH_{AIRMAX} \times Fno/H < 8 \quad \text{condition (12)}$$

where
$TH_{AIRMAX}$ is a maximum air space, except a back focus, on an optical axis of the lens system,
Fno is an F number of the lens system, and
H is an image height of the lens system.

16. The lens system according to claim 1, wherein the fixed lens group includes two or more positive power lens elements that satisfy the following condition (1):

$$dPgF > 0.015 \quad \text{condition (1)}$$

where dPgF is an anomalous dispersibility in a g-line and an F-line of the positive power lens elements in the fixed lens group.

17. An interchangeable lens apparatus comprising:
a lens system; and
a lens mount part connectable to a camera body, the camera body including an image sensor that receives an optical image formed by the lens system and converts the optical image into an electric image signal,
the lens system including
    a front group including a first focus lens group that moves with respect to an image surface in focusing from an infinity in-focus condition to a close-object in-focus condition;
    a rear group including a second focus lens group that moves with respect to the image surface in focusing from the infinity in-focus condition to the close-object in-focus condition, the front group and the rear group being located in order from an object side to an image side;
    a fixed lens group including at least one positive power lens element, the fixed lens group being located between the front group and the rear group and fixed with respect to the image surface in focusing; and
    an aperture diaphragm,
wherein the lens system satisfies the following condition (1):

$$dPgF > 0.015 \qquad \text{condition (1)}$$

where dPgF is an anomalous dispersibility in a g-line and an F-line of the positive power lens element in the fixed lens group.

18. A camera system comprising:
an interchangeable lens apparatus; and
a camera body,
the interchangeable lens apparatus including a lens system and a lens mount part connectable to the camera body,
the camera body being detachably connected to the interchangeable lens apparatus through a camera mount part and including an image sensor that receives an optical image formed by the lens system and converts the optical image into an electric image signal,
the lens system including
    a front group including a first focus lens group that moves with respect to an image surface in focusing from an infinity in-focus condition to a close-object in-focus condition;
    a rear group including a second focus lens group that moves with respect to the image surface in focusing from the infinity in-focus condition to the close-object in-focus condition, the front group and the rear group being located in order from an object side to an image side;
    a fixed lens group including at least one positive power lens element, the fixed lens group being located between the front group and the rear group and fixed with respect to the image surface in focusing; and
    an aperture diaphragm,
wherein the lens system satisfies the following condition (1):

$$dPgF > 0.015 \qquad \text{condition (1)}$$

where dPgF is an anomalous dispersibility in a g-line and an F-line of the positive power lens element in the fixed lens group.

* * * * *